(12) United States Patent
Naik et al.

(10) Patent No.: US 12,496,518 B1
(45) Date of Patent: Dec. 16, 2025

(54) TECHNIQUES FOR IDENTIFYING APPLICATION EVENTS

(71) Applicant: Amazon Technologies, Inc., Seattle, WA (US)

(72) Inventors: Kunjan Shridhar Naik, Redondo Beach, CA (US); Alex Bu, Santa Ana, CA (US); Peter Han, Chino Hills, CA (US); Mickey Ottis Williams, Fallbrook, CA (US); Brian Fisher, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 17/479,670

(22) Filed: Sep. 20, 2021

(51) Int. Cl.
  *A63F 13/352* (2014.01)
  *A63F 13/215* (2014.01)
  *A63F 13/24* (2014.01)

(52) U.S. Cl.
  CPC ......... *A63F 13/352* (2014.09); *A63F 13/215* (2014.09); *A63F 13/24* (2014.09)

(58) Field of Classification Search
  CPC ...... A63F 13/352; A63F 13/215; A63F 13/24; G06K 9/3266; G08B 13/19691; H04N 7/18
  See application file for complete search history.

(56) References Cited

U.S. PATENT DOCUMENTS

| | | | |
|---|---|---|---|
| 11,376,498 B2* | 7/2022 | Pierce | A63F 13/352 |
| 2016/0005281 A1* | 1/2016 | Laska | G08B 13/1961 |
| | | | 348/143 |
| 2019/0209925 A1* | 7/2019 | Benedetto | A63F 13/35 |
| 2019/0270018 A1* | 9/2019 | Evans | A63F 13/79 |
| 2020/0398138 A1* | 12/2020 | Hendrix | A63F 13/812 |
| 2021/0034906 A1* | 2/2021 | Van Welzen | G06V 20/635 |

* cited by examiner

*Primary Examiner* — Yingchuan Zhang
(74) *Attorney, Agent, or Firm* — Nicholson De Vos Webster & Elliott LLP

(57) ABSTRACT

This disclosure describes, in part, techniques for identifying application events. For instance, system(s) may provide an application, such as a gaming application, by receiving input data generated by a control device and updating states of the application using the input data. The system(s) may then send, to a display device, content data representing the states of the application. While providing the application, the system(s) may analyze the input data and/or the content data in order to determine that a criterion associated with an event is satisfied. Based on the determination, the system(s) may determine that the event has occurred. As such, the system(s) may perform one or more actions associated with the event. For example, the system(s) may cause a storing of the content data representing the event, send contextual help associated with the event, or send commentary associated with the application.

20 Claims, 15 Drawing Sheets

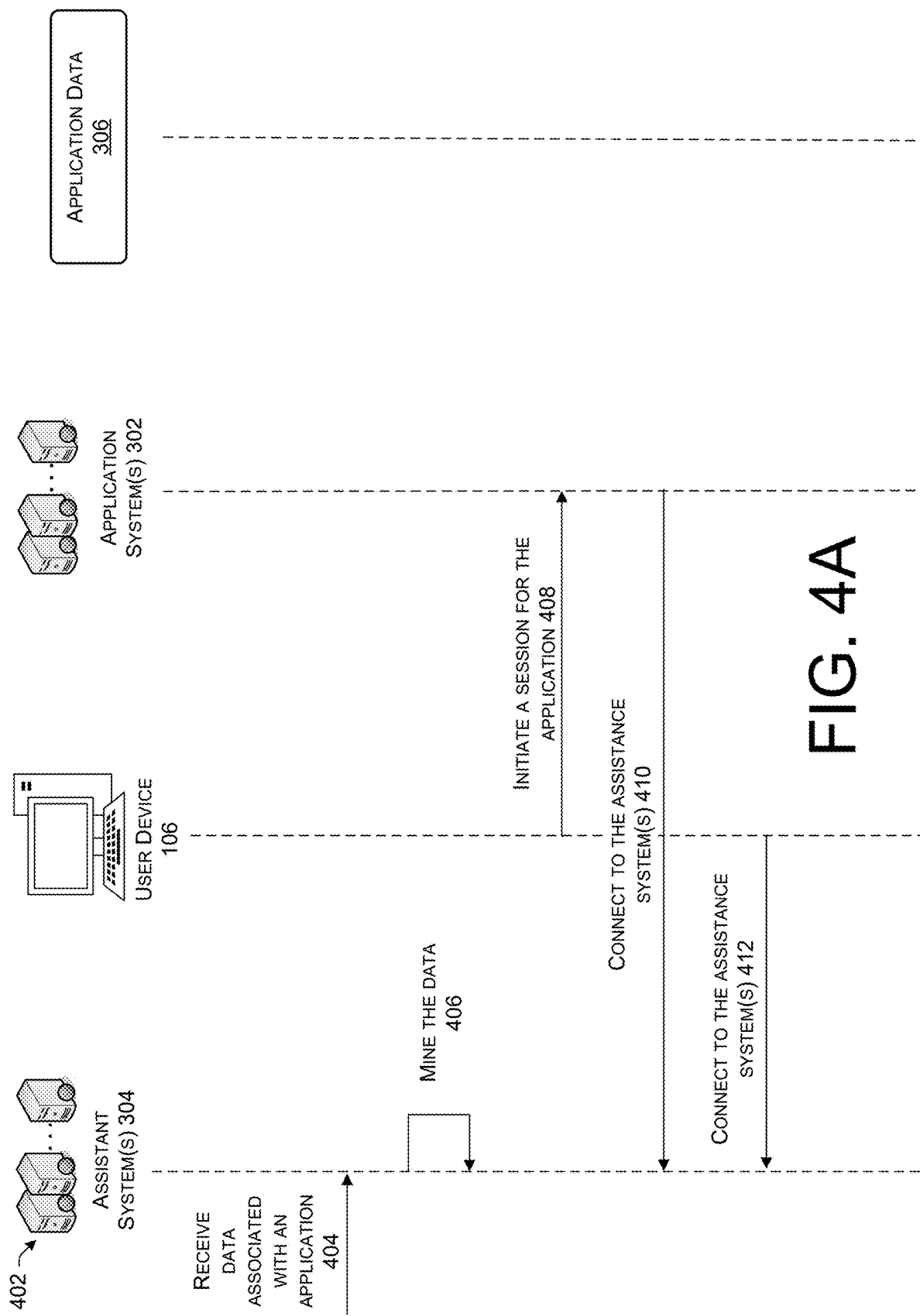

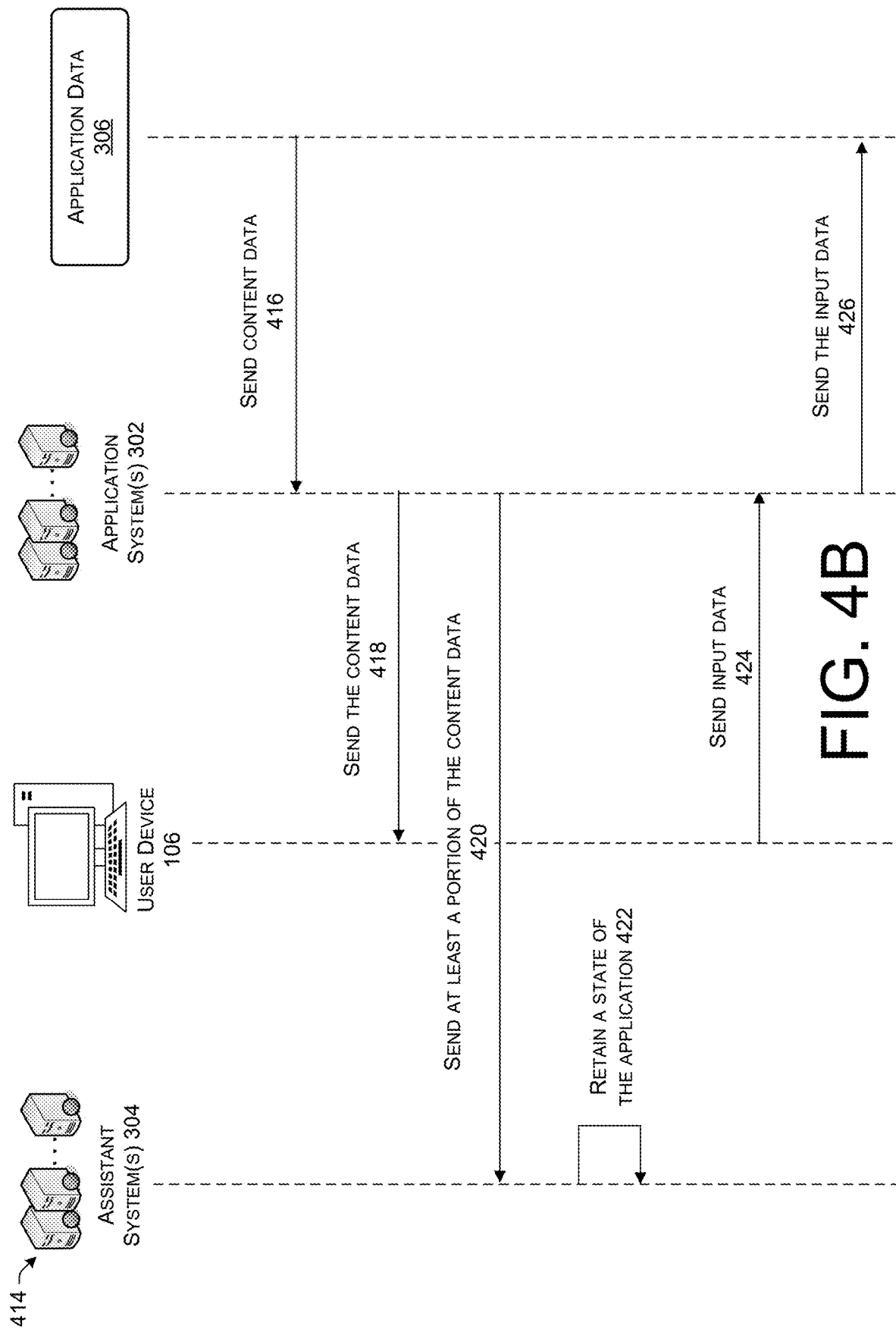

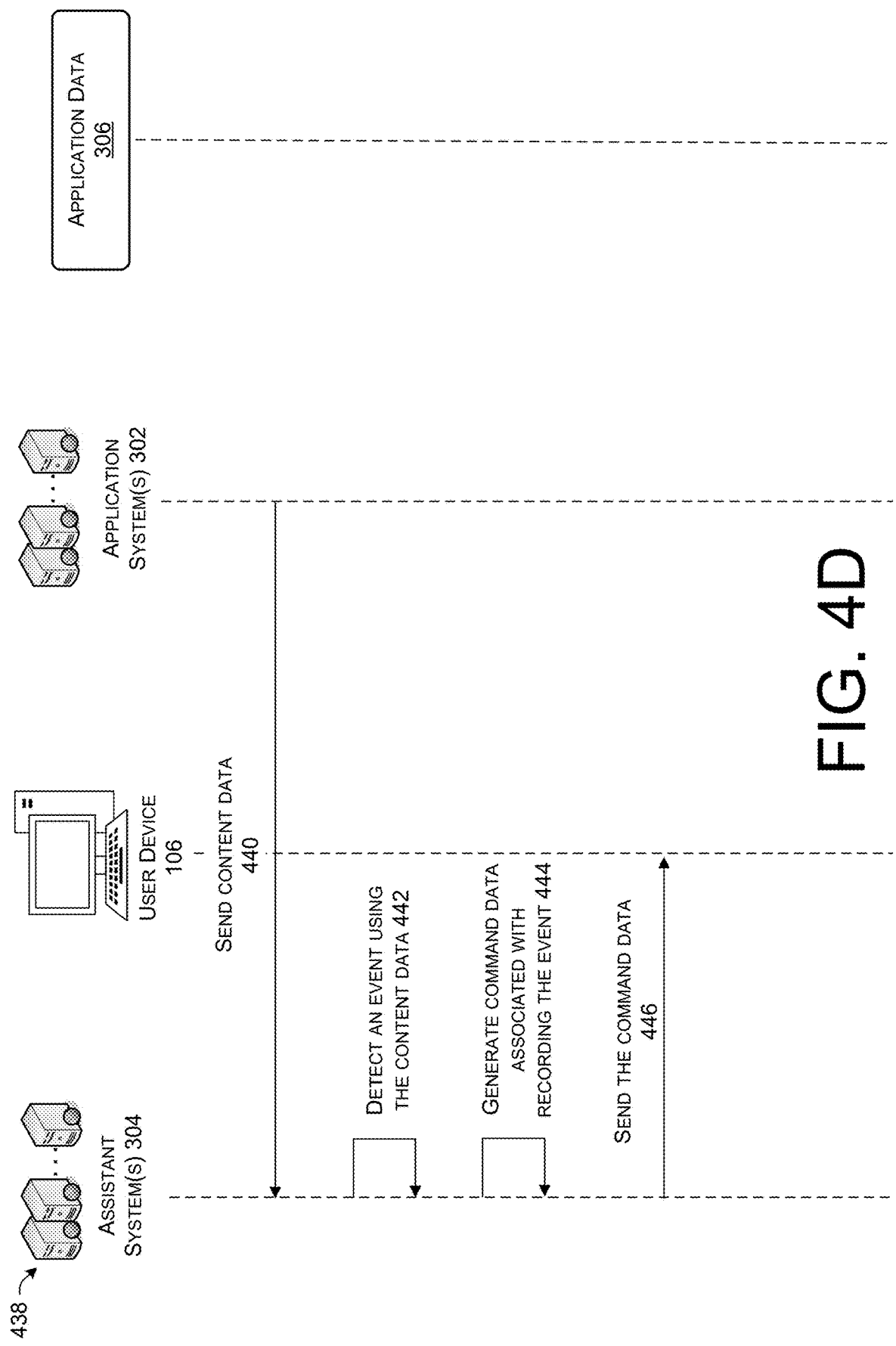

TECHNIQUES FOR IDENTIFYING APPLICATION EVENTS

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. In some circumstances, while playing the game, the user may experience a moment that the user wants to save or share with other users. For example, the user may score the winning points in a game, where the user would like to share highlights of the winning points with other users of the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-4D illustrate sequence diagrams for detecting events associated with an application and then performing actions associated with the events, in accordance with examples of the present disclosure.

DETAILED DESCRIPTION

Figure 1:
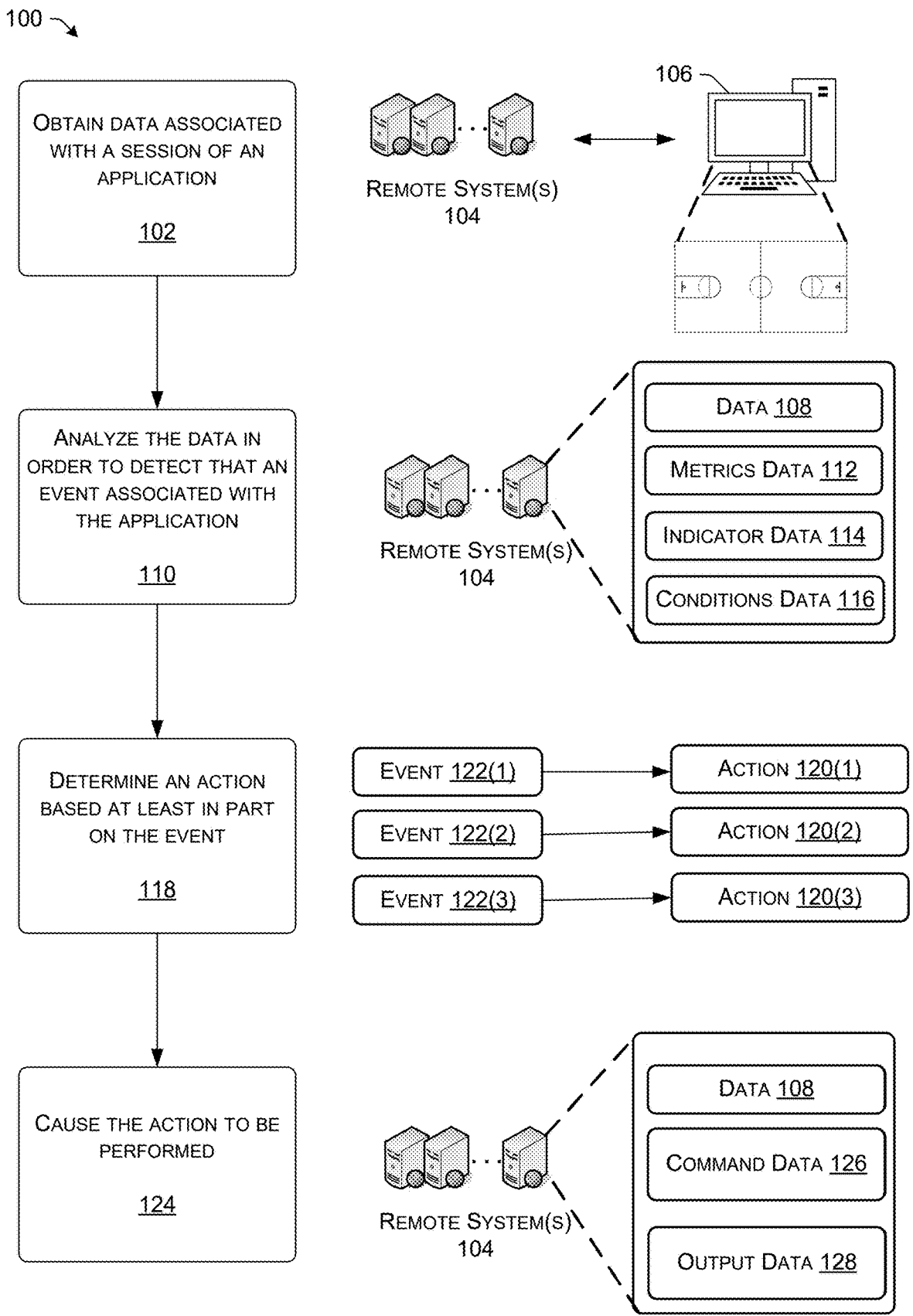
FIG. 1 illustrates an example process for detecting an event associated with an application and then performing an action associated with the event, in accordance with examples of the present disclosure.

This disclosure describes, in part, techniques for identifying application events. For instance, remote system(s) may be configured to provide a user with a session of an application, such as a gaming application, via network(s). For example, the remote system(s) may receive input data from a control device and then use the input data to update states of the application. The remote system(s) may then send, to a display device, content data (e.g., video data, audio data, feedback data, etc.) representing states of the application. While providing the application to the user, the remote system(s) (and/or another device, such as the control device, the display device, etc.) may analyze the input data, the content data, and/or other data to identify events that occur with respect to the session of the application. Based on identifying an event, the remote system(s) may perform one or more actions, such as saving a portion of the content data representing the event, providing feedback (e.g., contextual help) related to the event, notifying the user about conditions related to the session of the application (e.g., provide session commentary), and/or the like. This way, the remote system(s) (and/or another device) are able to automatically use the data associated with the session of the application in order to identify events that trigger specific actions to occur.

For more detail, the remote system(s) may provide the user with the application via network(s). The application may include, but is not limited to, a gaming application, a multimedia application (e.g., a movie, music, etc.), a travelling application, an educational application, and/or any other type of application. In some examples, to provide the application, the remote system(s) may create a virtual server that the remote system(s) use to install the application. As described herein, a virtual server may include a server (e.g., a computer and server programs) that executes at a remote location and is used to run applications. For example, the virtual server may include one or more dedicated computing resources, such as central processing units (CPUs), memory, storage devices, network capacity, and/or the like for running and providing the application. Before, during, and/or after installing the application onto the virtual server, the remote system(s) may associate the control device and/or the display device with the virtual server. The remote system(s) may then cause the application to launch on the virtual server, which begins the session.

For example, the user may provide inputs to the application using the control device. The control device may include, but is not limited to, a gaming controller, a keyboard, a mouse, a touch-interface device, a mobile phone, and/or any other type of device that is capable of receiving inputs from the user. Additionally, the inputs may include, but are not limited to, selections of input devices (e.g., button(s), joystick(s), key(s), touch-sensitive pad(s), sensor(s), etc.), user speech, motion of the control device, video of the user, text (e.g., in-application messages), and/or any other type of input. The remote system(s) may then receive, from the control device (and/or another device), input data representing the inputs received by the control device. Using the input data, the remote system(s) may continue to update the current states of the application. The remote system(s) may then send, to a display device and/or the control device, content data representing the current state of the application. As described herein, the content data may include, but is not limited to, video data, audio data, feedback data (e.g., haptic feedback data), and/or any other type of data that represents the current state of the application.

For example, if the application includes a gaming application, a first state of the application may include an object (e.g., a character) located at a first position within a gaming environment (e.g., a forest). The remote system(s) may then send, to the display device, content data representing the first state of the application. Using the content data, the display device may display image(s) representing the first state of the application. For example, and again if the application includes the gaming application, the display device may display image(s) representing the object located at the first position within the gaming environment. In some instances, the display device may further output sound represented by the audio data. The user may then use the control device and to provide inputs to the application via the remote system(s).

For instance, the control device may receive an input, such as a selection of a button, joystick, key, touch-sensitive pad, sensor, and/or the like associated with the control device. The control device may then send, to the remote system(s), input data representing the input. Using the input data, the remote system(s) may update the first state of the application to a second state of the application. For example, and again if the application includes the gaming application, the input may be associated with moving the object forward by a given amount within the gaming environment. As such, the remote system(s) may update the first state of the application to the second state of the application by moving the object forward in the gaming environment by the given amount. The remote system(s) may then send, to the display device, content data representing the second state of the application. Using the content data, the display device may display image(s) representing the second state of the application. For example, and again if the application includes the gaming application, the display device may display image(s) representing the object located at the second position within the gaming environment. In some instances, the display device may further output sound represented by the audio data. These processes may continue such that the remote system(s) provide the application to the user via the network(s).

While providing the application, the remote system(s) (and/or the control device, the display device, and/or another device) may analyze the content data and/or the input data in order to identify events that occur with respect to the application. In some examples, the remote system(s) identify the events using various metrics (e.g., a first type of criterion). As described herein, a metric may include, but is not limited to, an amount of motion associated with the video data, an intensity associated with the audio data, an input rate associated with the input data, and/or the like. For a first example, the remote system(s) may analyze the video data and, based on the analysis, determine an amount of motion that is occurring with respect to the current state of the application. In some examples, the remote system(s) may determine the amount of motion based on comparing first frame(s) represented by the video data with respect to second frame(s) representing by the video data. The remote system(s) may then determine that an event is occurring based on the amount of motion satisfying a threshold amount of motion. In some examples, the amount of motion satisfies the threshold amount of motion based on the amount of motion being equal to or greater than the threshold amount of motion. In some examples, the amount of motion satisfies the threshold amount of motion based on the amount of motion being less than the threshold amount of motion.

For a second example, the remote system(s) may analyze the content data (e.g., the audio data) and, based on the analysis, determine an intensity of sound that is occurring with respect to the current state of the application. In some examples, the remote system(s) determine the intensity in decibels. The remote system(s) may then determine that an event is occurring based on the intensity of sound satisfying a threshold intensity of sound (e.g., a threshold decibel level). In some examples, the intensity of sound satisfies the threshold intensity of sound based on the intensity of sound being equal to or greater than the threshold intensity of sound. In some examples, the intensity of sound satisfies the threshold intensity of sound based on the intensity of sound being less than the threshold intensity of sound.

Still, a third example, the remote system(s) may analyze the input data and, based on the analysis, determine a rate at which the control device is receiving input(s) from the user. The rate may include, but is not limited to, a number of inputs per second, a number of inputs per thirty seconds, a number of inputs per minute, and/or any other rate. The remote system(s) may then determine that an event is occurring based on the rate satisfying a threshold rate. In some examples, the rate satisfies the rate based on the rate being equal to or greater than the threshold rate. In some examples, the rate satisfies the threshold rate based on the rate being less than the threshold rate.

In some examples, the remote system(s) identify the events using additional and/or alternative techniques (e.g., criterion) than the metric(s) described above. The techniques may include, but are not limited to, speech recognition, object recognition, text recognition, motion detection associated with the control device, and/or the like. For a first example, the remote system(s) may determine that an event is occurring by analyzing the video data using object recognition and, based on the analysis, identifying a specific object associated with the current state of the application. For instance, and if the application includes a gaming application, the remote system(s) may determine that the event is occurring based on the video data representing a specific character or a specific item of the game. For a second example, the remote system(s) may determine that an event is occurring by analyzing the video data using text recognition and, based on the analysis, identify specific word(s). For instance, and again if the application includes a gaming application, the remote system(s) may determine that the event is occurring based on the video data representing the word "touchdown."

For a third example, the remote system(s) may determine that an event is occurring by analyzing the input data (e.g., the user speech) using speech recognition and, based on the analysis, determining that the user speech includes one or more words and/or a utterance. For instance, the remote system(s) may determine that the event is occurring based on the utterance including a request associated with the application. Still, for a fourth example, the remote system(s) may determine that an event is occurring by analyzing the audio data using speech recognition and, based on the analysis, identify specific word(s) and/or sounds. For instance, and again if the application includes a gaming application, the remote system(s) may determine that the event is occurring based on the audio data representing the word "touchdown" or the audio data representing a sound that is output each time a user scores a touchdown.

The remote system(s) (and/or the control device, the display device, and/or another device) may then perform one or more actions based on determining that the event is occurring. An action may include, but is not limited to, causing a recording of a portion of the application that represents the event (e.g., recording a highlight of the event), causing information related to the event to be provided to the user (e.g., providing contextual help), and/or any other action. For a first example, based on determining that an event is occurring, the remote system(s) may cause a portion of the content data, representing at least the event, to be stored. In some examples, the remote system(s) cause the portion of the content data to be stored by retrieving and storing the portion of the content data in one or more databases. Additionally, or alternatively, in some examples, the remote system(s) cause the portion of the content data to be stored by sending, to the display device (and/or the control device), data representing a command to store the portion of the content data. In such examples, the command may indicate at least a timestamp and/or other indicator that indicates when to begin storing the portion of the content data.

For a second example, and as discussed above, the remote system(s) may determine that an event is occurring based on determining that the input data represents user speech, where the user speech includes a request associated with the application. For instance, and again if the application includes a gaming application, the request may include a question about a location of specific object or character within the game. The remote system(s) may then determine information associated with the request. For instance, the remote system(s) may store data representing contextual help associated with the application. The remote system(s) may then analyze the data representing the contextual help in order to determine the information associated with the request, which is described in more detail below. For instance, if the request includes the question about the location of the specific object, the remote system(s) may analyze the data representing the contextual help in order to determine the location of the object. The remote system(s) may then generate data representing the information. The data may include, but is not limited to, audio data representing speech associated with the information (e.g., an audio prompt), image data representing the information (e.g., text), and/or any other type of data. The remote system(s) may then send the data to the display device (and/or the control device) for output by the display device (and/or the control device).

While the examples above describe analyzing the input data and the content data in order to determine when the events are occurring, in other examples, the remote system(s) may analyze other types of data. For example, the remote system(s) may receive and/or generate data (referred to, in some examples, as "sessions data") representing conditions that occur with regard to the session of the application. The conditions may include, but are not limited to, a network connectivity associated with the display device and/or the control device, a friend of the user joining the session associated with the application, a friend of the user leaving the session associated with the application, a problem occurring with the session of the application, an entitlement being acquired, and/or any other type of event. The remote system(s) may then generate data representing information associated with the condition. The data may include, but is not limited to, audio data representing speech associated with the information (e.g., an audio prompt), image data representing the information (e.g., text), and/or any other type of data. The remote system(s) may then send the data to the display device (and/or the control device) for output by the display device (and/or the control device).

As described above, the remote system(s) (and/or the control device, the display device, and/or another device) may analyze various types of data in order to determine that the events are occurring. In some examples, the remote system(s) may be automatically setup with criteria (e.g., metrics) that are used to detect the events. In some examples, the remote system(s) may receive data representing criteria that is used to detect the events. For example, the user may specify criteria for specific events that cause the automatic recording of the portion of the content data. In such examples, the remote system(s) may store data representing the criteria in association with user profile data associated with the user. This way, each time that the user accesses the application via the remote system(s), the remote system(s) are able to use the data to identify the events specified by the user.

In some examples, the remote system(s) may include a single system that performs all of the processes described herein with respect to the remote system(s). However, in other examples, the remote system(s) may include more than one system that together perform all of the processes described herein with respect to the remote system(s). For example, first remote system(s) may perform the processes described herein for providing the application to the user (e.g., receiving the input data, updating the state of the application using the input data, sending the content data, etc.) while second remote system(s) perform the processes described herein for detecting the events, causing the recording of the content data, and/or providing the contextual information associated with the application. In such an example, the first remote system(s) may be associated with a game server while the second remote system(s) are associated with an assistant service that communicates with the game server, the control device, and/or the display device.

While the examples above describe identifying event(s) for a single user, in some examples, similar processes may be performed in order to identify event(s) when multiple users are accessing the application. For example, such as when the application includes a game, the user may be participating in a multiplayer game with one or more other users. In such an example, the remote system(s) may be receiving and sending similar types of data with user device(s) of the other user(s). For example, the remote system(s) may be receiving input data from the user device(s) of the other user(s), updating states of the game using the input data, and then sending content data representing the states of the game to the user device(s). In some examples, the states of the game are similar for each of the users. For example, each user device may be receiving the same content data (e.g., the same video data, audio data, feedback data, etc.) representing global states of the game and use the content data to provide the global states of the game. This may occur in situations where each user includes the same view of the gaming environment, such as a view of the field in a soccer game. In other examples, the states of the game may be different for each of the users. For example, each user device may be receiving content data (e.g., video data, audio data, feedback data, etc.) representing local states of the game that are unique to each user and then use the content data to provide the local states of the game. This may occur in situations where each user includes a unique view of the gaming environment, such as in a first-person type game.

The remote system(s) may then analyze the data (e.g., the input data and the content data for each user) associated with the multiplayer game in order to detect events, using similar processes as those described above. Additionally, when detecting an event, the remote system(s) may cause one or more actions to occur. In some examples, the remote system(s) may cause actions to occur for more than one user when an event is detected. For example, if the remote system(s) analyze the content data that is being sent to a first user device and, based on the analysis, detect an event, then the remote system(s) may cause the same action to occur for other user devices. For instance, the remote system(s) may cause a storing of content data that is being sent to each of the user devices based on detecting the event. This may be because the content data being sent to each of the user devices may all represent the event, such as from different angles or different points of view. When performing such processes, the remote system(s) may also retrieve all of the content data associated with the event and provide the content data to all of the users (e.g., send the highlights associated with the content data to all of the user devices).

By performing the processes described herein, the remote system(s) are able to automatically record events (e.g., highlights) for the user to later review, save, and/or share with other users. This provides multiple improvements, in that the user may not miss recording these events and/or may not be required to manually record these events, which may take time and/or affect the session of the application. Additionally, by performing the processes described herein, the remote system(s) are able to provide information, such as contextual help and/or session commentary, to the user during the session of the application.

As described above, the remote system(s) (and/or the control device, the display device, and/or another device) may analyze data using various recognition techniques in order to detect events. For a first example, the remote system(s) may analyze the data using speech recognition techniques that enable the recognition and translation of text by the remote system(s). The models, methods, and/or algorithms used for the speech recognition techniques may include, but are not limited to, Hidden Markov Models, Dynamic Time Warping-Based Speech Recognition, Neural Networks, Deep Feedforward and Recurrent Neural Networks, and/or any other technique. For a second example, the remote system(s) may analyze the data using object recognition that enables the detecting of objects represented by the data. The models, methods, and/or algorithms used for object recognition may include, but are not limited to, Non-Neural Approaches (e.g., Viola-Jones Object Detection Framework based on Haar Features, Scale-Invariant Feature Transform, Histogram of Orientation Gradients Features, etc.), Neural Network Approaches (e.g., Region Proposals, You Only Look Once, Deformable Convolutional Networks, etc.), and/or any other technique.

FIG. 1 illustrates an example process 100 for identifying an event associated with an application and then performing an action associated with the event, in accordance with examples of the present disclosure. At 102, the process 100 may include obtaining data associated with a session of an application. For instance, the remote system(s) 104 (and/or the user device 106) may obtain data 108 associated with the application. As described herein, the data 108 may include, but is not limited to, content data generated by the remote system(s) 104, input data generated by the user device 106, sessions data associated with the session of the application, and/or any other type of data. For instance, and in the example of FIG. 1, the application may include a gaming application, such as a sports game. As such, the input data may represent the inputs received by the user device 106 for the game. Additionally, the content data may represent the current states of the game as being output by the user device 106. Furthermore, the sessions data may represent events that occur during the session, such as a network connectivity of the user device 106, friends joining or leaving the session, entitlements earned, and/or the like.

At 110, the process 100 may include analyzing the data in order to detect an event associated with the application. For instance, the remote system(s) 104 (and/or the user device 106) may analyze the data 108 in order to detect the event. In some examples, to detect the event, the remote system(s) 104 use metrics data 112 representing one or more metrics for detecting events. As described herein, a metric may include, but is not limited to, a threshold amount of motion, a threshold intensity of sound, a threshold rate for inputs, and/or any other metric. For a first example, the remote system(s) 104 may detect the event by analyzing the data 108 and, based on the analysis, determining that an amount of motion satisfies the threshold amount of motion. For a second example, the remote system(s) 104 may detect the event by analyzing the data 108 and, based on the analysis, determining that an intensity of sound satisfies the threshold intensity of sound. For a third example, the remote system(s) 104 may detect the event by analyzing the data 108 and, based on the analysis, determining that a rate at which the user device 106 is receiving inputs satisfies the threshold rate.

Additionally, or alternatively, in some examples, to detect the event, the remote system(s) 104 may use indicator data 114 representing object(s), text, sound(s), word(s), question(s), user motion, and/or the like for detecting events. For a first example, the remote system(s) 104 may detect the event by analyzing the data 108 using object recognition and, based on the analysis, identifying a specific object associated with the current state of the application. For a second example, the remote system(s) 104 may detect the event by analyzing the data 108 using text recognition and, based on the analysis, identify specific word(s). For a third example, the remote system(s) 104 may detect the event by analyzing the data 108 using speech recognition and, based on the analysis, determining that the user speech includes one or more words. Still, for a fourth example, the remote system(s) 104 may detect the event by analyzing the data 108 using speech recognition and, based on the analysis, identify specific word(s) and/or sounds.

Additionally, or alternatively, in some examples, to detect the event, the remote system(s) 104 may use conditions data 116 representing various session conditions. For a first example, the remote system(s) 104 may detect the event by analyzing the data 108 (e.g., the sessions data) and, based on the analysis, determine that a friend of the user joined the session (e.g., a condition of the session). For a second example, the remote system(s) 104 may detect the event by analyzing the data 108 (e.g., the sessions data) and based on the analysis, determine that a friend of the user left the session (e.g., a condition of the session). For a third example, the remote system(s) 104 may detect the event by analyzing the data 108 (e.g., the sessions data) and based on the analysis, determine a network condition associated with the user device 106 (e.g., a condition of the session). The network condition may include, but is not limited to, low network bandwidth, a disconnection from the session, and/or any other network connection.

At 118, the process 100 may include determining an action based at least in part on the event. For instance, the remote system(s) 104 may determine an action 120(1)-(3) based at least in part a type of event 122(1)-(3). For a first example, based on detecting a first type of event 122(1), the remote system(s) 104 may determine that the action 120(1) includes storing at least a portion of the data 108 that represents the event (e.g., storing highlights of the event). In some examples, the portion of the data 108 may include at least the content data, such as the video data and/or the audio data, that is output by the user device 106 and represents the event. For a second example, based on detecting a second type of event 122(2), such as when the event 122(2) includes a request associated with the application, the remote system(s) 104 may determine that an action 120(2) includes providing information (e.g., contextual help) to the user. Still, for a third example, based on detecting a third type of event 122(3), such as when the event 122(3) is associated with a condition of the session, the remote system(s) 104 may determine that an action 120(3) includes providing session specific information (e.g., session commentary) to the user.

At 124, the process 100 may include causing the action to be performed. For instance, the remote system(s) 104 may then cause the action to be performed. For a first example, the remote system(s) 104 may cause the action 120(1) to be performed by causing the portion of the data 108 to be stored. In some examples, to cause the portion of the data 108 to be stored, the remote system(s) 104 retrieve and then store the portion of the data 108. For instance, the remote system(s) 104 may include a buffer, such as a rolling buffer, that stores a given time period of the data 108 (e.g., the content data). As such, the remote system(s) 104 may retrieve the portion of the data 108 that is associated with the event from the buffer, which is described in more detail with regard to FIG. 6A.

Additionally, or alternatively, in some examples, the remote system(s) 104 may generate command data 126 representing a command to store the portion of the data 108. In some examples, the command may include a timestamp and/or other indictor that indicates the portion of the data 108 for storing. The remote system(s) 104 may then send the command data 126 to the user device 106. Using the command data 126, the user device 106 may then store the portion of the data 108, similar to the remote system(s) 104. For instance, the user device 106 may include a buffer, such as a rolling buffer, that stores a given time period of the data 108 (e.g., the content data). As such, the user device 106 may retrieve the portion of the data 108 that is associated with the event from the buffer. For instance, the user device 106 may use the timestamp from the command to identify and store the portion of the data 108. In either of these examples, the portion of the data 108 may represents a given time period. The given time period may include, but is not limited to, one second, five seconds, ten seconds, thirty seconds, and/or any other time period.

For a second example, the remote system(s) 104 may cause the action 120(2) to be performed by sending the information (e.g., the contextual help) to the user. For instance, and as described in more detail below, the remote system(s) 104 may store contextual data representing contextual help, such as a tutorial, a guide, a cheat book, and/or the like, associated with the application. The remote system(s) 104 may also store state data representing the current state of the application. For instance, the state data may represent the current level, location, time, progress, and/or the like associated with where the user is within the application. The remote system(s) 104 may then use the contextual data and the state data to determine information associated with the request. For instance, if the request is for a specific object located within a gaming environment, the remote system(s) 104 may use the state data to determine where the user is located within the game and then use the contextual data to determine the location of the specific object. The remote system(s) 104 may then generate output data 128 representing the information. As described herein, the output data 128 may include, but is not limited to, image data representing the information, audio data representing the information, and/or any other type of data. The remote system(s) 104 may then send the output data 128 to the user device 106 so that the user device 106 may output the information to the user.

Still, for a third example, the remote system(s) 104 may cause the action 120(3) to be performed by sending information associated with the session to the user. For instance, the remote system(s) 104 may generate the information, where the information represents the network condition, that a friend joined the session, that a friend left the session, that the user has obtained an entitlement, and/or the like. The remote system(s) 104 may then again generate output data 128 representing the information. Additionally, the remote system(s) 104 may send the output data 128 to the user device 106 so that the user device 106 may output the information to the user.

Figure 2:
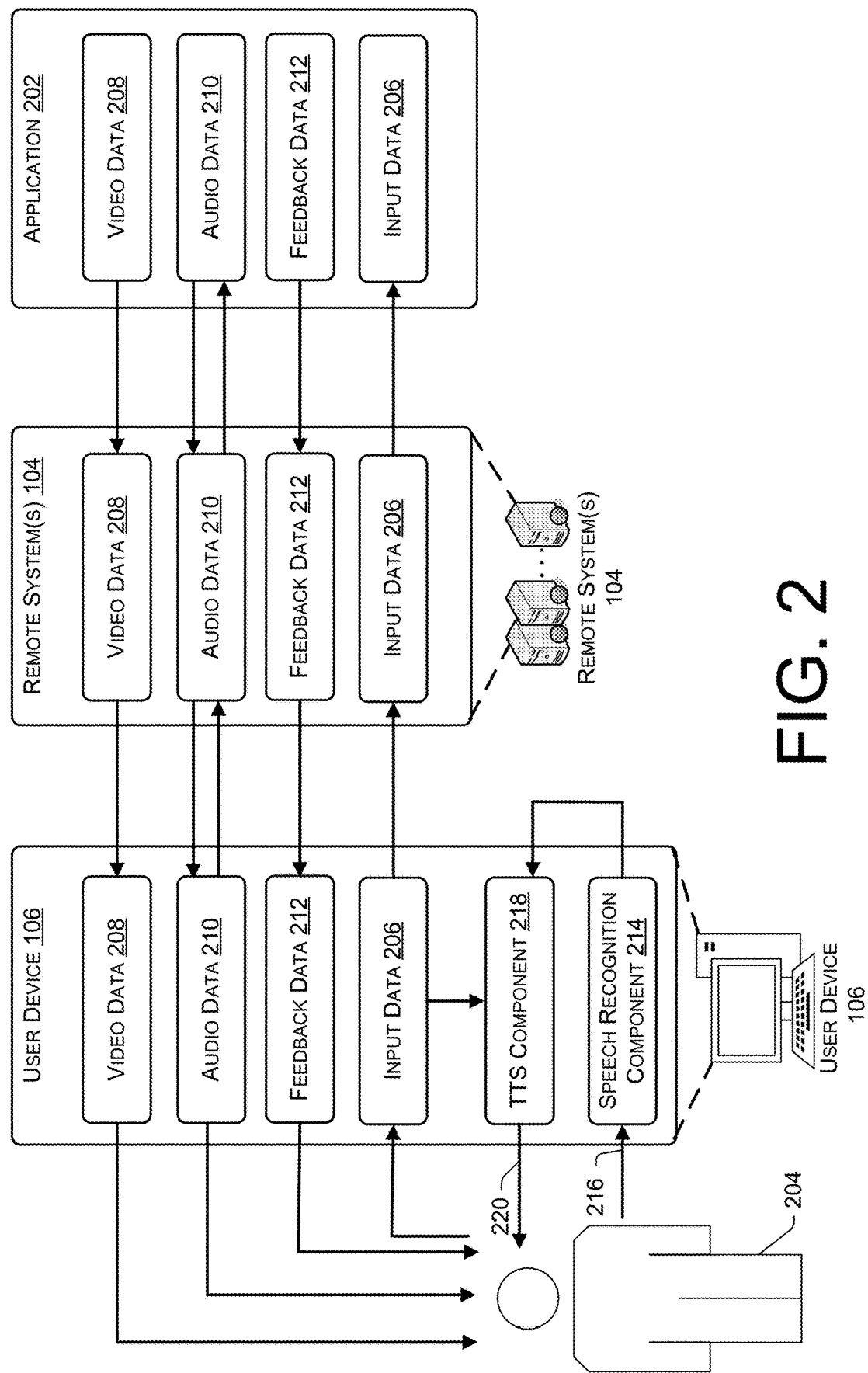
FIG. 2 illustrates an example of various types of data that may be communicated between entities during a session of an application, in accordance with examples of the present disclosure.

As described herein, during a session for an application, various types of data may be communicated between computing devices. As such, FIG. 2 illustrates an example of various types of data that may be communicated between entities during a session of an application, in accordance with examples of the present disclosure. As shown, the entities may include at least the remote system(s) 104, the user device 106, an application 202, and a user 204. Although the example FIG. 2 illustrates the application 202 as being separate from the remote system(s) 104, in other examples, the application 202 is executing on the remote system(s) 104.

As shown, the user device 106 may receive inputs from the user 204 and then generate input data 206 representing the inputs. As described herein, the inputs may include, but are not limited to, selections of controls (e.g., a button, a joystick, a key, a touch-sensitive pad, a sensor, etc.), user speech, motion of the user device 106, video of the user 204, text (e.g., in-application messages), and/or any other type of input. The user device 106 may then send the input data 206 to the remote system(s) 104, which then sends the input data 206 to the application 202 for execution. For example, the application 202 may perform one or more of the processes described herein to update the states of the application 202 using the input data 206.

The application 202 may generate video data 208 and audio data 210 representing the current states of the application. The application 202 may then send the video data 208 and the audio data 210 to the remote system(s) 104, which then sends the video data 208 and the audio data 210 to the user device 106. Additionally, and as shown by the example of FIG. 2, the user device 106 may output content represented by the video data 208 and the audio data 210 to the user 204. For example, and as shown below, the user device 106 may include a display for displaying images represented by the video data 208 and also include speaker(s) for outputting sound represented by the audio data 210.

As further illustrated in the example of FIG. 2, in some examples, the application 202 may also generate feedback data 212 that causes the user device 106 to provide feedback to the user 204. In some examples, the feedback may include haptic feedback, such as by causing the user device 106 to rumple, vibrate, and/or shake. For instance, the application 202 may send the feedback data 212 to the remote system(s) 104, which then sends the feedback data 212 to the user device 106. The user device 106 may then use the feedback data 212 to provide the feedback to the user 204. For example, based on receiving the feedback data 212, the user device 106 may rumple, thus providing the feedback to the user 204.

As further illustrated in the example of FIG. 2, the user device 106 may include a speech recognition component 214 that is configured to analyze user speech 216 captured from the user 204. As described herein, the models, methods, and/or algorithms used by the speech recognition component 214 may include, but are not limited to, Hidden Markov Models, Dynamic Time Warping-Based Speech Recognition, Neural Networks, Deep Feedforward and Recurrent Neural Networks, and/or any other technique. For instance, and as described herein, the user device 106 may use the speech recognition component 214 to analyze the user speech 216 in order to detect an event.

As further illustrated by the example of FIG. 2, the user device 106 may include a text-to-speech (TTS) component 218. The TTS component 218 may be configured to generate speech using text represented by various types of data. For example, and as described herein, the remote system(s) 104 may send, to the user device 106, data representing information associated with an event. As such, the user device 106 may use the TTS component 218 in order to generate speech representing the information. The TTS component 218 may then output, to the user 204, sound 220 representing the speech.

Figure 3:
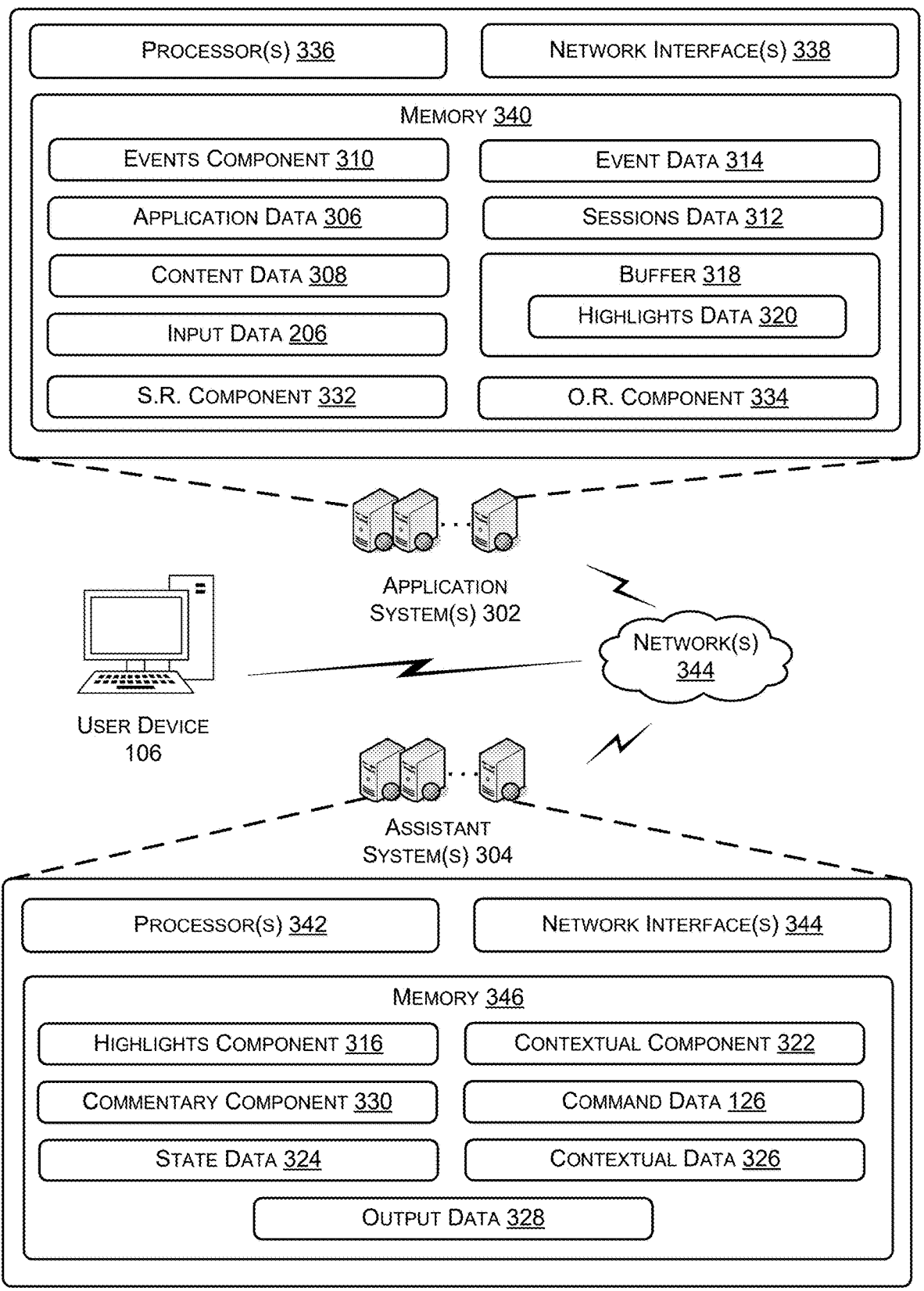
FIG. 3 illustrates an example environment that may be used to detect events associated with an application and then perform actions associated with the events, in accordance with examples of the present disclosure.

FIG. 3 illustrates an example environment for identifying events associated with an application and then performing actions associated with the events, in accordance with examples of the present disclosure. As shown, the example environment includes the user device 106, application system(s) 302, and assistant system(s) 304. In some examples, the remote system(s) 104 may include the application system(s) 302 and the assistant system(s) 304. In other examples, the application system(s) 302 may be separate from the assistant system(s) 304.

In the example of FIG. 3, the application system(s) 302 may be configured to provide applications, where the applications are represented by application data 306. For example, and as described herein, the user may provide inputs to the application using the user device 106. The user device 106 may include, but is not limited to, a gaming controller, a keyboard, a mouse, a touch-interface device, a mobile phone, and/or any other type of device that is capable of receiving inputs from the user. Additionally, the inputs may include, but are not limited to, selections of controls (e.g., a button, a joystick, a key, a touch-sensitive pad, a sensor, etc.), user speech, motion of the user device 106, video of the user, text (e.g., in-application messages), and/or any other type of input. The application system(s) 302 may then receive, from the user device 106, the input data 206 representing the inputs received by the user device 106. Using the input data 206, the application system(s) 302 may continue to update the current states of the application. The application system(s) 302 may then send, to a user device 106 (and/or a separate display device), content data 308 representing the current state of the application. As described herein, the content data 308 may include, but is not limited to, the video data 208, the audio data 210, the feedback data 212 (e.g., haptic feedback data), and/or any other data that represents the current state of the application. This process is described with respect to FIG. 10.

As shown, the application system(s) 302 may include an events component 310 that is configured to analyze the input data 206, the content data 308, and/or sessions data 312 associated with the session of the application in order to detect events. In some examples, the events component 310 detects the events using one or more metrics (e.g., the metric(s) represented by the metrics data 112). For example, the events component 310 may be configured to analyze the content data 308 in order to determine when an amount of motion satisfies a threshold amount of motion and/or when an intensity of sound satisfies a threshold intensity of sound. Additionally, the events component 310 may be configured to analyze the input data 206 to determine when a rate at which the user device 106 is receiving inputs satisfies a threshold rate.

In some examples, the events component 310 detects the events using speech recognition, object recognition, text recognition, motion detection associated with the user device 106, and/or the like (e.g., using indicators represented by the indicator data 114). For a first example, the events component 310 may determine that an event is occurring by analyzing the content data 308 (e.g., the video data 208) using object recognition and, based on the analysis, identifying a specific object associated with the current state of the application. For a second example, the events component 310 may determine that an event is occurring by analyzing the content data 308 (e.g., the video data 208) using text recognition and, based on the analysis, identify specific word(s). For a third example, the events component 310 may determine that an event is occurring by analyzing the input data 206 (e.g., the user speech) using speech recognition and, based on the analysis, determining that the user speech includes one or more words. Still, for a fourth example, the events component 310 may determine that an event is occurring by analyzing the content data 308 (e.g., the audio data 210) using speech recognition and, based on the analysis, identify specific word(s) and/or sounds.

In some examples, the events component 310 detects events that occur with the sessions data 312 (e.g., using activities represented by the conditions data 116). For a first example, the events component 310 may determine that an event is occurring by analyzing the sessions data 312 and, based on the analysis, determining one or more characteristics associated with a network connection associated with the user device 106. For a second example, the events component 310 may determine that an event is occurring by analyzing the sessions data 312 and, based on the analysis, determining that a friend of the user has joined the session. Still, for a third example, the events component 310 may determine that an event is occurring by analyzing the sessions data 312 and, based on the analysis, determining that a friend of the user has left the session. While these are just a few example techniques of how the events component 310 may detect events using the input data 206, the content data 308, and/or sessions data 312, in other examples, the events component 310 may use additional and/or alternative techniques.

In some examples, after detecting an event, the events component 310 may send, to the assistant system(s) 304, at least a portion of the input data 206, the content data 308, and/or the sessions data 312 that represents the event. Additionally, or alternatively, in some examples, after detecting an event, the events component 310 may send, to the assistant system(s) 304, events data 314 indicating that the event is occurring. In such examples, the events data 314 may further indicate a type of event, a timestamp indicating when the event occurred, content associated with the event (e.g., the request made by the user), and/or any other type of information. In either of the examples, the assistant system(s) 304 may then determine one or more actions to perform based on the event.

For a first example, the assistant system(s) 304 may include a highlights component 316 that causes a storing of a portion of the content data 308 that represents the event. In some examples, to cause the storing of the portion of the content data 308, the highlights component 316 may generate the command data 126 that represents the command to store the portion of the content data 308. In some examples, the command includes a timestamp and/or other indicator that indicates the portion of the content data 308 to store, which is described in more detail with regard to FIG. 6A. The assistant system(s) 304 may then send the command data 126 to the application system(s) 302 and/or the user device 106.

For instance, and as shown in the example of FIG. 3, the application system(s) 302 may include a buffer 318, such as a rolling buffer, that stores a portion of the content data 308. As the application system(s) 302 continue to send new content data 308 to the user device 106, the application system(s) 302 may further update the content data 308 that is stored in the buffer 318 with at least a portion of the new content data 308. As such, based on receiving the command data 126 from the assistant system(s) 304, the application system(S) 302 may retrieve, from the buffer 318, the portion of the content data 308 that represents the event, where the portion of the content data 308 is represent by highlights data 320. In some examples, the application system(s) 302 may retrieve and store a threshold time period of the content data 308 (e.g., one second, five seconds, ten seconds, thirty seconds, and/or any other time period). Additionally, or alternatively, in some examples, the command data 126 may indicate the starting point and the stopping point associated with the portion of the content data 308. In such examples, the application system(s) 302 may retrieve and store the portion of the content data 308 that is associated with the starting point and the stopping point.

For a second example, the assistant system(s) 304 may include a contextual component 322 that is configured to generate and/or provide contextual help to the user. For instance, and as described herein, the assistant system(s) 304 may store state data 324 representing the current state (e.g., the context) of the application. For instance, the state data 324 may represent the current level, location, time, progress, and/or the like associated with where the user is within the application. In some examples, the assistant system(s) 304 determine the current state of the application using data (e.g., content data 308) received from the application system(s) 302.

Additionally, the assistant system(s) 304 may store contextual data 326 for providing the contextual help to the user. As described herein, the contextual data 326 may represent a tutorial, a guide, a cheat book, and/or the like associated with the application. For a first example, if the application includes a gaming application where a character is configured to advance through different levels, the contextual data 326 may represent a tutorial that includes at least the layouts of the levels, information for how to advance through the levels (e.g., the routes to proceed through the levels, hidden locations within the levels, etc.), the locations of characters within the levels, information on how to advance past characters, the locations of objects (e.g., items) within the levels, information on how to obtain the objects, and/or any other information that would help the user advance through the gaming application. For a second example, if the application includes a sports game application, then the contextual data 326 may represent a tutorial that includes player statistics, team statistics, plays for different teams, layouts of stadiums and/or courses, and/or any other information.

As such, the contextual component 322 may use the state data 324 and the contextual data 326 to provide the contextual help to the user. For instance, the assistant system(s) 304 may receive, from the application system(s) 302 (and/or the user device 106, which is described in more detail below), audio data representing user speech. The contextual component 322 may then analyze the audio data, using one or more speech recognition techniques described herein, in order to determine a request represented by the user speech. For example, if the application includes a gaming application, the contextual component 322 may determine that the audio data represents a request for an item (e.g., "Where is the box located within this room?"). The contextual component 322 may then be configured to use the state data 324 and the contextual data 326 to generate information (e.g., a response) associated with the question.

For instance, the contextual component 322 may use the state data 324 to determine the current state of the application (e.g., the level that the user is currently playing, the location of the user within the level, etc.). The contextual component 322 may then use the contextual data 326 to determine the information associated with the request. For instance, if the request is for the location of the box within the room, then the contextual component 322 may use the contextual data 326 to determine the location of the box based on the current location of the user within the room (e.g., "The box is behind the door."). The contextual component 322 may then generate output data 328 representing the information. In some examples, the output data 328 includes audio data representing one or more words describing the information. In some examples, the output data 328 includes other types of data, such as image data representing text describing the information or image data representing visual clues that provide the information to the user (e.g., arrows showing the location of the box). In any of the examples, the assistant system(s) 304 may then send the output data 328 to the user device 106.

For a third example, the assistant system(s) 304 may include a commentary component 330 that is configured to generate and/or provide commentary associated with the application. For instance, the commentary component 330 may use the sessions data 312, which represents conditions associated with the session of the application, in order to identify different types of events. The commentary component 330 may then be configured to generate information (e.g., commentary) describing the events. For instance, if the sessions data 312 indicates that a friend of the user has joined the session, then the commentary component 330 may generate information indicating that the friend has joined the session (e.g., "Friend 1 has joined the session".). The commentary component 330 may then generate output data 328 representing the information. In some examples, the output data 328 includes audio data representing one or more words describing the information. In some examples, the output data 328 includes other types of data, such as image data representing text describing the information or image data representing visual clues that provide the information to the user (e.g., arrows pointing to the friend that just joined). In any of the examples, the assistant system(s) 304 may then send the output data 328 to the user device 106.

As further illustrated in the example of FIG. 3, the application system(s) 302 (and similarly the assistant system(s) 304) may include a speech recognition component 332. In some examples, the speech recognition component 332 may convert the audio data 210 into text. The speech recognition component 332 transcribes the audio data 210 into text data representing the words of the speech represented by the audio data 208. The text data may then be used by other components for various purposes, such as to identify events. In some examples, an utterance represented by the audio data 210 is input into the speech processing component 332 which then interprets the utterance based on the similarity between the utterance and pre-established speech processing language models stored in a model knowledge base. For example, the speech recognition process may compare the input audio data 210 with models for sounds (e.g., subword units or phonemes) and sequences of sounds to identify words and/or sounds that match the sequence of sounds spoken in the utterance of the audio data 210.

The different ways an utterance may be interpreted (i.e., the different hypotheses) may each be assigned a speech recognition probability or a speech recognition confidence score representing the likelihood that a particular set of words matches those spoken in the utterance. The speech recognition confidence score may be based on a number of factors including, for example, the similarity of the sound in the utterance to models for language sounds, and the likelihood that a particular word which matches the sounds would be included in the sentence at the specific location (e.g., using a language or grammar model). Thus, each potential textual interpretation of the spoken utterance (hypothesis) is associated with a speech recognition confidence score. Based on the considered factors and the assigned speech recognition confidence score, the speech recognition component 332 outputs the most likely text recognized in the audio data 210.

The speech recognition component 332 may include an acoustic front end (AFE) and a speech recognition engine. The AFE transforms the audio data 208 into data for processing by the speech recognition engine. The speech recognition engine compares the speech recognition data with acoustic models, language models, and other data models and information for recognizing the speech conveyed in the audio data 210. The AFE may reduce noise in the audio data 210 and divide the digitized audio data 210 into frames representing time intervals for which the AFE determines a number of values, called features, representing the qualities of the audio data 210, along with a set of those values, called a feature vector, representing the features/ qualities of the audio data 210 within the frame. Many different features may be determined, as known in the art, and each feature represents some quality of the audio that may be useful for speech recognition processing. A number of approaches may be used by the AFE to process the audio data 210, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine may process the output from the AFE with reference to information stored in speech/model storage. Alternatively, post front-end processed data (such as feature vectors) may be received by the device executing speech recognition processing from another source besides the internal AFE. For example, a device may process audio data 210 into feature vectors (for example using an on-device AFE) and transmit that information to a server across a network for speech recognition processing.

The speech recognition engine attempts to match received feature vectors to language phonemes and words as known in the stored acoustic models and language models. The speech recognition engine computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Following speech recognition processing, the speech recognition results may be sent by the speech recognition engine to other processing components, such as the events component 310. While this is just one example technique for performing speech recognition, in other examples, the speech recognition component 332 may use additional and/ or alternative techniques.

As further illustrated in the example of FIG. 3, the application system(s) 302 (and similarly the assistant system(s) 304) may include an object recognition component 334. The object recognition component 334 may analyze the video data 208 using one or more models, methods, and/or algorithms in order to identify objects and/or text represented by the video data 208. The models, methods, and/or algorithms used for object recognition may include, but are not limited to, Non-Neural Approaches (e.g., Viola-Jones Object Detection Framework based on Haar Features, Scale-Invariant Feature Transform, Histogram of Orientation Gradients Features, etc.), Neural Network Approaches (e.g., Region Proposals, You Only Look Once, Deformable Convolutional Networks, etc.), and/or any other technique. In some examples, the object recognition component 334 may further analyze characters, such as avatars, represented by the video data 208 in order to identify the characters. For example, if the application includes a gaming application, the object recognition component 334 may analyze an avatar using facial recognition in order to identify the avatar and/or a user that is associated with the avatar.

In the examples above, the assistant system(s) 304 (and/or the application system(s) 302) may receive and/or generate the contextual data 326 using one or more techniques. For example, a developer of an application (e.g., one or more computing devices associated with the developer) may upload the application to the application system(s) 302 (and/or the assistant system(s) 304, such as after developing the application). In such an example, the developer may also upload the contextual data 326 associated with the application, such when uploading the application. Additionally, the developer may also upload updates to the contextual data 326 whenever the developer updates the contextual data 326. For example, each time there is an update to the application itself, the developer may upload both the update to the application and the update to the contextual data 326. This way, the application system(s) 302 and/or the assistant system(s) 304 may continue to store the most updated contextual data 326 for the application.

Additionally, or alternatively, in some example, the assistant system(s) 304 (and/or the application system(s) 302) may use additional and/or alternative techniques to receive the contextual data 326. For example, the assistant system(s) 304 may search through online resources, such as social networking websites, gaming websites, blogs, messages, posts, and/or any other online resource, in order to identify information that the assistant system(s) 304 may use for generating the contextual data 326. For instance, if a user of the application determines how to perform a task, such as identifying an item, then the user may post information to an online resource that indicates how to perform the task. As such, the assistant system(s) 304 may analyze the information on the online resource in order to determine how to perform the task. The assistant system(s) 304 may then generate contextual data 326 that represents information on how to perform the task.

Additionally, or alternatively, the assistant system(s) 304 (and/or the application system(s) 302) may allow for users to provide information for generating the contextual data 326. For example, when a user performs a task, the user may use the user device 106 to send, to the assistant system(s) 304 (and/or the application system(s) 304), information on how to perform the task. The assistant system(s) 304 may then use the information to generate the contextual data 326. In some examples, the user may provide the information based on receiving an inquiry from the assistant system(s) 304. For example, if there is as task that other users have inquired about, but which the contextual data 326 does not include information, the assistant system(S) 304 may ask other user(s), such as other user(s) that have performed the task, for the information. In response, the assistant system(s) 302 may receive the information from the user device 106.

As further illustrated in the example of FIG. 3, the application system(s) 302 may include processor(s) 336, network interface(s) 338, and memory 340, and the assistant system(s) 304 may include processor(s) 342, network interface(s) 344, and memory 346. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the user device 106, the application system(s) 302, and the assistant system(s) 304, as well as other networked devices, such as via network(s) 344. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 4C:
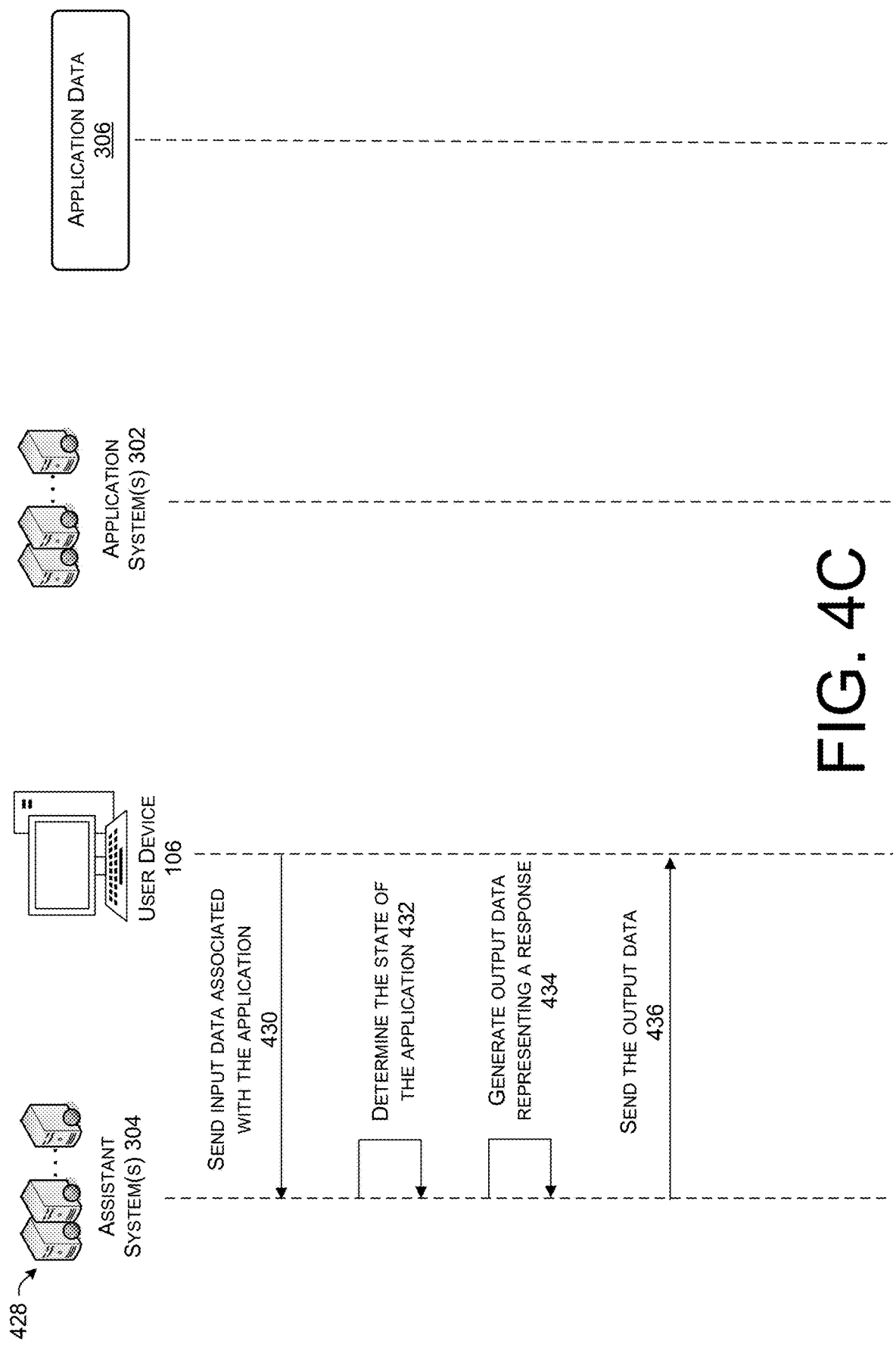

FIGS. 4A-4D illustrate sequence diagrams for detecting events associated with an application and then performing actions associated with the events, in accordance with examples of the present disclosure. For instance, FIG. 4A illustrates a sequence diagram 402 for initially setting up the application. As shown, at 404, the assistant system(s) 304 may receive data associated with an application. For instance, a new game may be ingested at 404 by the assistant system(s) 304 receiving the data. In some examples, the data may include the content data 308 associated with the application. At 406, the assistant system(s) 304 may then mine the data. For instance, the assistant system(s) 304 may mine the data in order to determine a context associated with the application.

At 408, the user device 106 may then initiate a session for the application. In some examples, the user device 106 initiates the session for the application by sending, to the application system(s) 302, data (e.g., input data 206) representing a selection of the application and/or data representing an identifier associated with the application. The application system(s) 302 may then associate the user device 106 with the application, such as with the virtual server that is executing the application. Based on the user device 106 initiating the session, and at 410, the application system(s) 302 may connect to the assistant system(s) 304 and at 412, the user device 106 may also connect to the assistant system(s) 304. For example, both the user device 106 and the application system(s) 302 may establish respective communication channels with the assistant system(s) 304.

FIG. 4B illustrates a sequence diagram 414 for providing the application. At 416, the application (which is represented by the application data 306) may send content data 308 to the application system(s) 302. As described herein, the content data 308 may include, but is not limited to, the video data 208, the audio data 210, the feedback data 212, and/or any other type of data. At 418, the application system(s) 302 may then send the content data 308 to the user device 106. The user device 106 may then use the content data 308 to provide content to the user. For example, the user device 106 may use the video data 208 to display images representing the current state of the application and use the audio data 210 to output sound representing the current state of the application.

At 420, the application system(s) 302 may send at least a portion of the content data 308 to the assistant system(s) 304 and at 422, the assistant system(s) 304 may retain a state of the application. In some examples, the application system(s) 302 send the at least the portion of the content data 308 to the assistant system(s) 304 at given time intervals (e.g., every second, every five seconds, every ten seconds, etc.). Additionally, or alternatively, in some examples, the application system(s) 302 send the at least the portion of the content data 308 to the assistant system(s) 304 based on a condition occurring, such as detecting an event or receiving a request for the at least the portion of the content data 308. The assistant system(s) 304 may then use at least the portion of the content data 308 to determine and retain the state. As described herein, the state may indicate the current level, location, time, progress, and/or the like associated with where the user is within the application. In some examples, the application system(s) 302 send an entirety of the content data 308. In other examples, the application system(s) 302 send only a portion of the content data 308 that is needed for the assistant system(s) 304 to retain the state.

At 424, the user device 106 sends input data 206 to the application system(s) 302 and at 426, the application system(s) 302 send the input data 206 to the application. In some examples, the user device 106 sends the input data 206 based on receiving an input. In some examples, the user device 106 sends the input data 206 at the elapse of given time intervals (e.g., every millisecond, every 50 milliseconds, every second, etc.) As described herein, the application may then use the input data 206 to update the state of the application to a new state of the application. Additionally, in some examples, the sequence diagram 414 may continue to repeat during the session of the application.

FIG. 4C illustrates a sequence diagram 428 for providing contextual help associated with the application. At 430, the user device 106 (and/or the application system(s) 302)) may send input data 206 to the assistant system(s) 304. As described herein, the input data 206 may include audio data representing user speech, where the user speech includes a request (e.g., a question) associated with the application. For example, the user speech may include a request for a location of an object, a request for help on how to proceed through the application (e.g., how to get past a character), a request for how to use an item, a request for a location of a friend, and/or any other type of request.

At 432, the assistant system(s) 304 may determine the state of the application. For instance, based on receiving the request, the assistant system(s) 304 may analyze the data representing the retained state in order to determine the current state of the application. Next, at 436, the assistant system(s) 304 may generate output data 328 representing a response. For instance, using the state and the contextual data 326 associated with the application, the assistant system(s) 304 may determine the response (e.g., information) to the question. The assistant system(S) 304 may then generate the output data 328 representing the response. Additionally, and at 436, the assistant system(s) 304 may send the output data 328 to the user device 106.

FIG. 4D illustrates a sequence diagram 438 for causing a storing of content data representing an event. At 440, the application system(s) 302 may send content data 308 to the assistant system(s) 304. Based at least in part on receiving the content data 308, and at 442, the assistant system(s) 304 may detect an event using the content data 308. For instance, the assistant system(S) 304 may perform one or more of the processes described herein, with respect to the remote system(s) 104, the application system(s) 302, and/or the user device 106, to detect the event.

At 444, the assistant system(s) 304 may generate command data 126 associated with recording the event. For instance, the assistant system(s) 304 may generate the command data 126 that represents a command to store the portion of the content data 308 that represents the event. In some examples, the command may include a timestamp and/or other indictor that indicates the portion of the content data 308 for storing. At 446, the assistant system(s) 304 may then send the command data 126 to the user device 106 (and/or the application system(s) 302).

Figure 5:
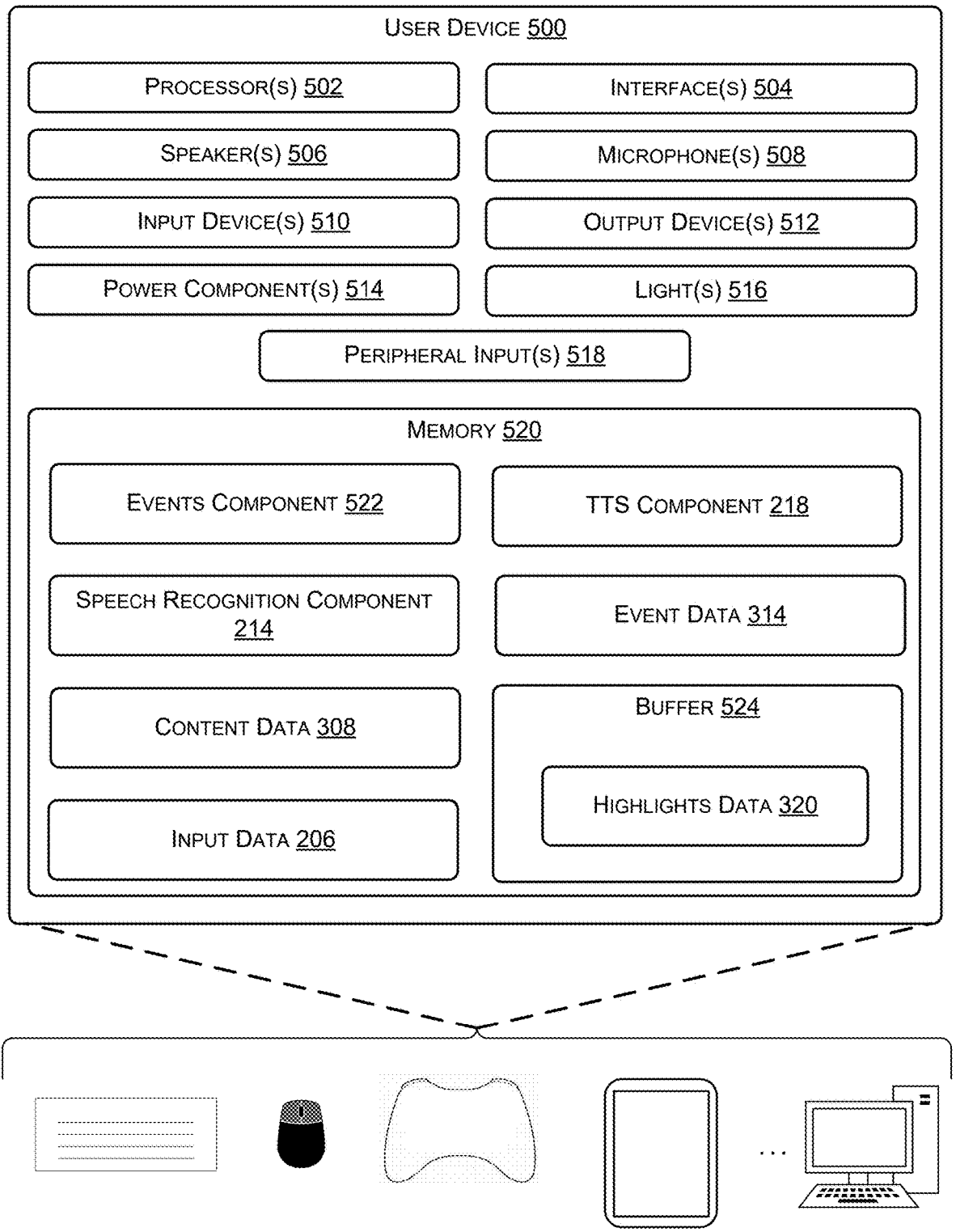
FIG. 5 illustrates a block diagram of an example architecture of a user device, in accordance with examples of the present disclosure.

FIG. 5 illustrates a block diagram of an example architecture of a user device 500. As shown, the user device 500 includes one or more processors 502, one or more network interfaces 504, one or more speakers 506, one or more microphones 508, one or more input devices 510, one or more output devices 512, one or more power components 514, one or more lights 516, one or more peripheral inputs 518, and memory 520. In some instances, the user device 500 may include one or more additional components no illustrated in the example of FIG. 5. In some instances, the user device 500 may not include one or more the speaker(s) 506, the microphone(s) 508, the input device(s) 510, the output device(s) 512, the light(s) 516, or the peripheral input(s) 518. Still, in some examples, the user device 500 may be broken into multiple devices, such as a first device that outputs content (e.g., includes a display, speakers, etc.) and a control device.

Although the user device 500 is illustrated as having one or more integral speaker(s) 506, in other examples, the user device 500 may not include speaker(s) 506. For example, the user device 500 may produce an audio output signal that drives an external loudspeaker, such as headphones connected to the user device 500 via a peripheral input 518. As another example, the user device 500 may drive or control an external loudspeaker through a wireless data connection such as a Bluetooth connection. In other situations, the user device 500 may be used in conjunction with a loudspeaker device that receives audio data and other instructions from the remote system 105, rather than from the user device 500.

The microphone(s) 508 may include sensors (e.g., transducers) configured to receive sound. The microphone(s) 508 may generate input signals for audio input (e.g., sound). For example, the microphone(s) 508 may determine digital input signals for an utterance of a user. In some instances, the microphone(s) 508 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 5115) to receive sound from four directions. The microphone(s) 508 may be in a planar configuration, or positioned apart in a non-planar three-dimensional region. In some instances, the microphone(s) 508 may include a spatially disparate array of sensors in data communication. For example, a networked array of sensors may be included. The microphone(s) 508 may include omni-directional microphones, directional microphones (e.g., shotgun microphones), and so on.

In some instances, the microphone(s) 508 and the speaker(s) 506 facilitate interactions, such as dialogue, with a user. The microphone(s) 508 produce audio data representing sound from the environment of the user device 500, such speech utterances by the user. The audio data produced by the microphone(s) 508 may comprise directional audio signals or may be used to produce directional audio signals, where each of the directional audio signals emphasizes audio from a different radial direction relative to the microphone(s) 508.

The input device(s) 510 may include button(s), key(s), joystick(s), touch-sensitive pad(s), trigger(s), sensor(s) that detect movement of the user device 500 (e.g., accelerometer(s), magnetometer(s), etc.), and/or any other type of device that is able to receive input from the user. The output device(s) 512 may include devices that provide feedback to the user. For a first example, the output device(s) 512 may include a display that presents content to the user. For a second example, the output device(s) 512 may include haptic driver(s) that cause actuator(s) to activate.

The power component(s) 514 may be configured to provide power to the user device 500. For a first example, power component(s) 514 may include one or more batteries. For a second example, the power component(s) 514 may include components connected to a source of external AC (alternating-current) power, such as a household AC power supply (alternatively referred to herein as "AC mains" or "wall power").

The light(s) 516 may include visual indicator(s) (e.g., light-emitting diodes (LEDs)) that emit light when activated by the user device 500. In some instances, the visual indicator(s) may include a light ring disposed on a portion of the user device 500. In other instances, the visual indicator(s) may be disposed on various portions on the user device 500. The peripheral input(s) 518 may include one or more components for connecting peripheral devices to the user device 500. For instance, a peripheral input 518 may include a jack for connecting headphones to the user device 500.

The user device 500 may include memory 550. The memory 550 may be used to store any number of software components that are executable by the processor(s) 502. Software components stored in the memory 550 may include at least an events component 522, the TTS component 218, and the speech recognition component 214. In some examples, the events component 522 may be configured to perform similar processes as the events component 310 in order to detect events using at least the content data 308 and/or the input data 206. In some examples, and similar to the application system(s) 302, the user device 500 may then send, to the assistant system(s) 304, data representing the events.

As further illustrated in the example of FIG. 5, the user device 500 may include a buffer 524. In some examples, the buffer 524 includes a rolling buffer that is configured to store the most recent content represented by the content data 308. For example, the buffer 524 may be configured to store the most recent second, five seconds, ten seconds, thirty seconds, and/or any other time period of the content. This way, when the user device 500 receives a command to store a portion of the content data 308, the user device 500 can retrieve the portion of the content data 308 from the buffer 524, where the portion of the content data 308 is represented by highlights data 320. In some examples, the user device 500 then stores the highlights data 320 in one or more databases.

For example, during a session of an application, the user device 500 may retrieve and store various portions of the content data 308 that represent various highlights of events. In some examples, the user device 500 stores a threshold number of portions of the content data 308 (e.g., a threshold number of highlights associated with the application). For example, and for a given session, the user device 500 may store one highlight, five highlights, ten highlights, and/or any other number of highlights. In some examples, once the session is finished, the user device 500 may then provide the highlights to the user. This way, the user is able to view the highlights, select highlights to keep, and/or select highlights to share with other users.

Figure 6A:
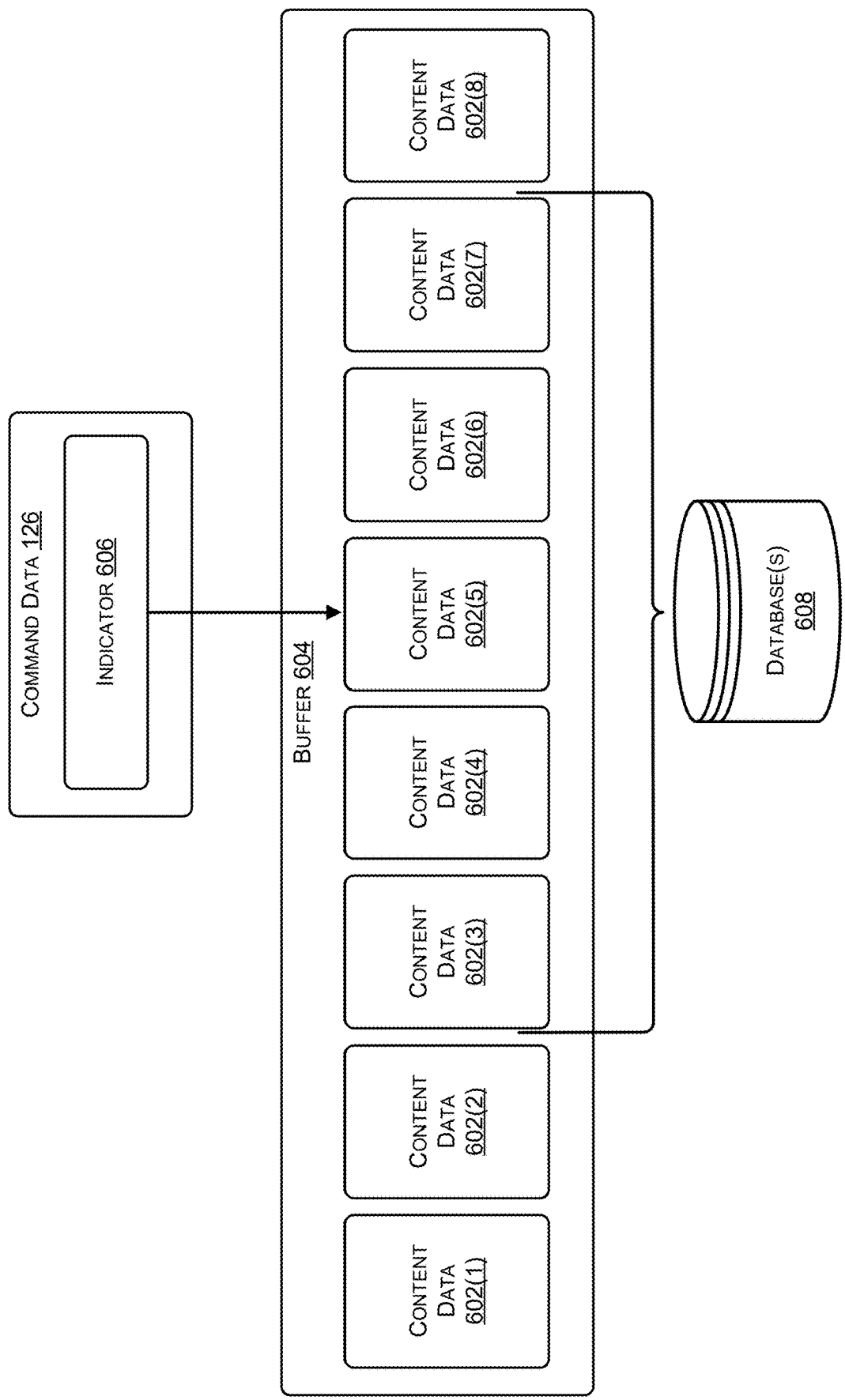
FIG. 6A illustrates an example of storing a portion of content data that represents a highlight, in accordance with examples of the present disclosure.

FIG. 6A illustrates an example of storing a portion of content data that represents a highlight, in accordance with examples of the present disclosure. As shown, a device (e.g., the remote system(s) 104, the user device 106, the application system(s) 302, the user device 500, etc.) may store content data 602(1)-(8) (also referred to as "content data 602") (which may represent, and/or include, the content data 308) in a buffer 604 (which may represent, and/or include, the buffer 318 and/or the buffer 524). In the example of FIG. 6A, the content data 602 is broken up into various portions. In some examples, such as when the content data 602 includes video data, each portion of the content data 602 may represent a given number of frames (e.g., 1 frame, 5 frames, 10 frames 50 frames, 100 frames, etc.). Additionally, or alternatively, in some examples, each portion of the content data 602 may represent a given time interval associated with the content represented by the content data 602 (e.g., 1 second, 5 seconds, 10 seconds, 30 seconds, 1 minute, etc.).

In some examples, the buffer 604 may include a rolling buffer such that the most recent time interval of the content data 602 is stored in the buffer 604. For example, if the device generates and/or receives a new portion of the content data 602, then the device may remove the oldest portion of the content data 602(1) in order to store the new portion of the content data 602 in the buffer 604.

The device may then receive the command data 126 representing the command to store a portion of the content data 602 that represents an event. In the example of FIG. 6A, the command data 126 may include at least an indicator 606 that points to a portion of the content data 602 to record and/or that represents the event. In some examples, the indicator 606 may include a timestamp that indicates a portion of the content data 602. For instance, the timestamp may indicate a time associated with the portion of the content data 602(5). In some examples, the indicator 606 may include an identifier that indicates a portion of the content data 602. For instance, the identifier may indicate the portion of the content data 602(5) (e.g., the identifier may indicate the frame represented by the portion of the content data 602(5)). Still, in some examples, the indicator 606 may represent a time period. For instance, the indicator may represent a time period that includes the portions of the content data 602(3)-(7).

The device may then use the command data 126 to retrieve and then store the portion of the content data 602 in database(s) 608. In some examples, and as illustrated by the example of FIG. 6A, the device may store the portion of the content data 602(5) indicated by the indicator 606 as well as the portions of the content data 602(3)-(4) that are associated with a first time period that is before the portion of the content data 602(5) and the portions of the content data 602(6)-(7) that are associated with a second time period that is after the portion of the content data 602(5). In some examples, the first time period may be the same as the second time period. However, in other examples, the first time period may be different than the second time period. Additionally, in some examples, the device may retrieve and then store a threshold time period of the content data 602 such as, but not limited to, one second, five seconds, ten seconds, thirty seconds, and/or any other time period.

Figure 6B:
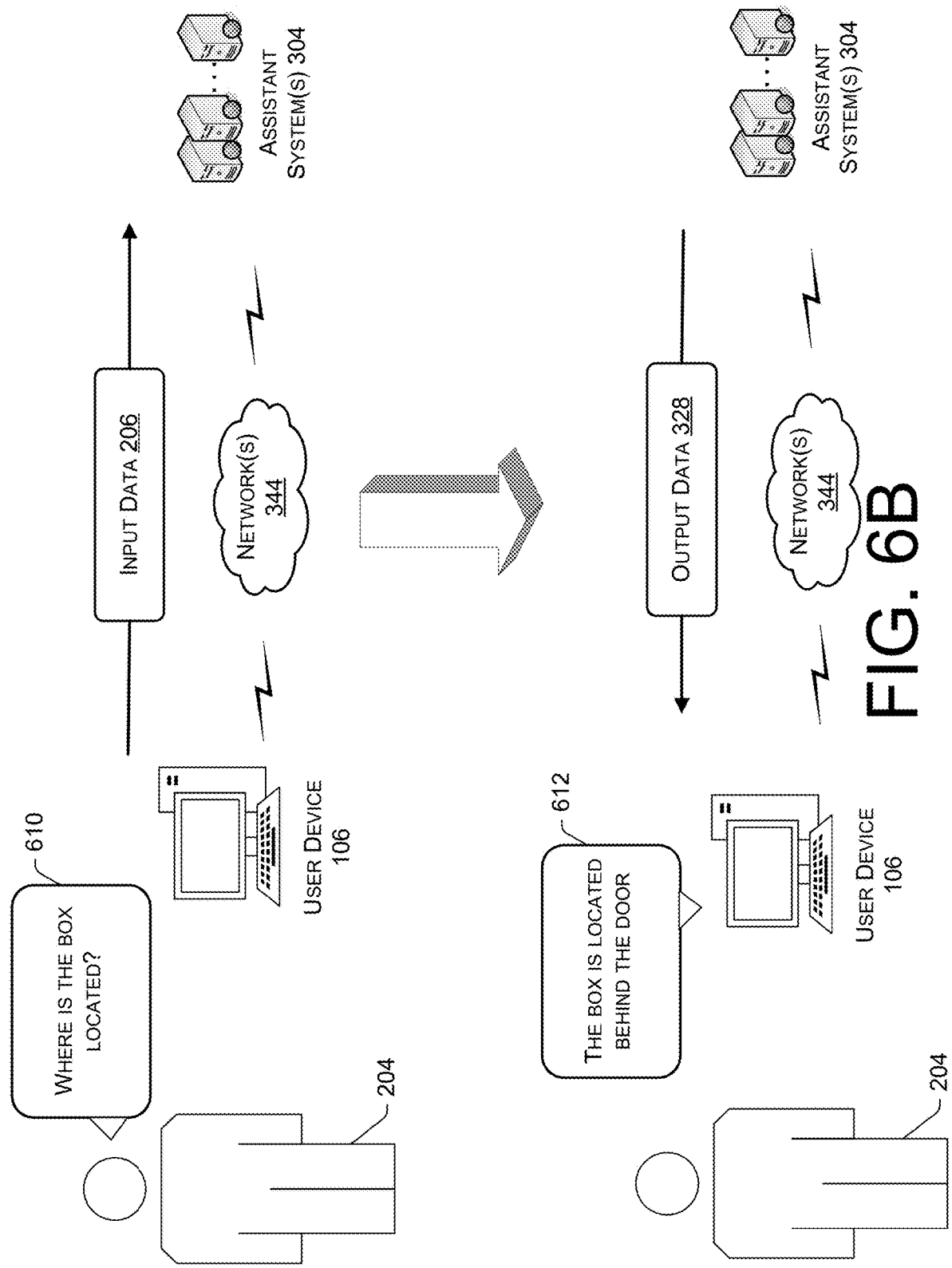
FIG. 6B illustrates an example of providing contextual help, in accordance with examples of the present disclosure.

As described above, in addition to causing the recording of highlights, the system(s) may cause additional actions to occur. For instance, FIG. 6B illustrates an example of providing contextual help, in accordance with examples of the present disclosure. In the top illustration of the example of FIG. 6B, the user 204 makes a request 610 asking, "Where is the box located?". The user device 106 then generates input data 206 representing user speech that includes the request 610 made by the user 204. Additionally, the user device 106 sends the input data 206 to the assistant system(s) 304. In some examples, the user device 106 sends the input data 206 to the assistant system(s) 304 via the application system(s) 302. For example, the application system(s) 304 may analyze the input data 206, using one or more of the processes described herein, to determine that the input data 206 represents the request 610. Based on determining that the input data 206 represents the request 610, the application system(s) 302 may then send the input data 206 to the assistant system(s) 302.

In the bottom illustration of the example of FIG. 6B, the assistant system(s) 304 may then determine that the input data 206 represents the request 610 and generate information 612 associated with the request 610. In some examples, the assistant system(s) 304 may perform one or more of the speech recognition techniques described herein to determine that the input data 206 represents the request 610. The assistant system(s) 304 may then analyze the state data 324 to determine the current state of the application. For example, the assistant system(s) 304 may analyze the state data 324 to determine the current level of the user 204, the current location of the user 204 within the level, and/or the like. The assistant system(s) 304 may then use the contextual data 326 to generate the information 612 associated with the request 610. For example, the assistant system(s) 304 may use the contextual data 326 to determine the location of the box within the level and/or the location of the box with respect to the current location of the user within the level.

The assistant system(s) 304 may then generate the information 612 that indicates the location of the box within the level and/or the location of the box with respect to the current location of the user 204 within the level. For example, the information 612 may indicate that "The box is located behind the door.". The assistant system(s) 304 may then generate the output data 328 that represents the information 612 and send the output data 328 to the user device 106. In some examples, the assistant system(s) 304 send the output data 328 to the user device 106 via the application system(s) 302. Using the output data 328, the user device 106 may then provide the information 612 to the user 204. For instance, and in the example of FIG. 6B, the user device 106 may output sound representing the information 612. However, in other examples, the user device 612 may output the information 612 using other types of content, such as by displaying an image that includes the information 612.

Figure 7:
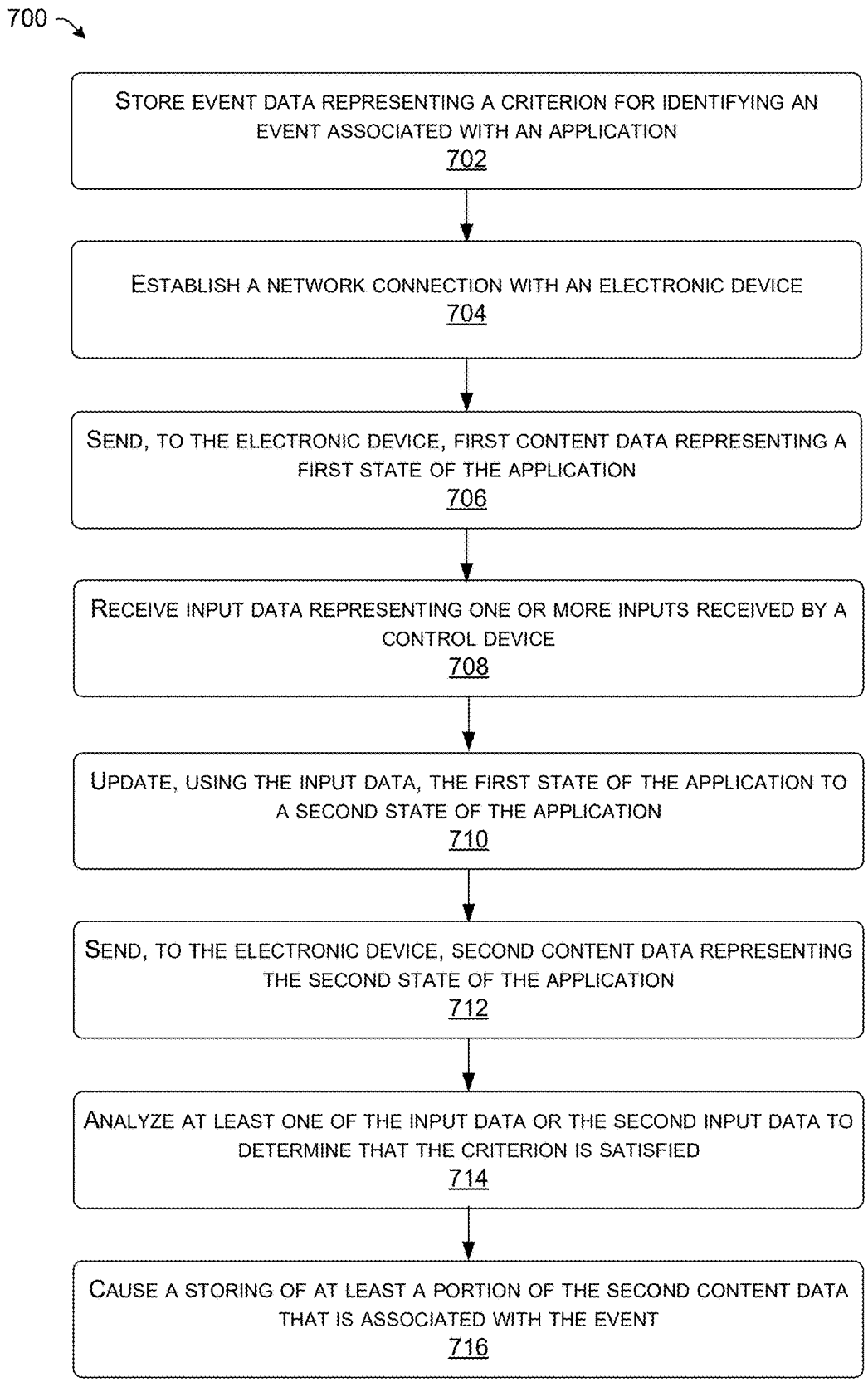
FIG. 7 illustrates a first example process for identifying an event associated with an application and then causing a recording of content based on the event, in accordance with examples of the present disclosure.
Figure 8:
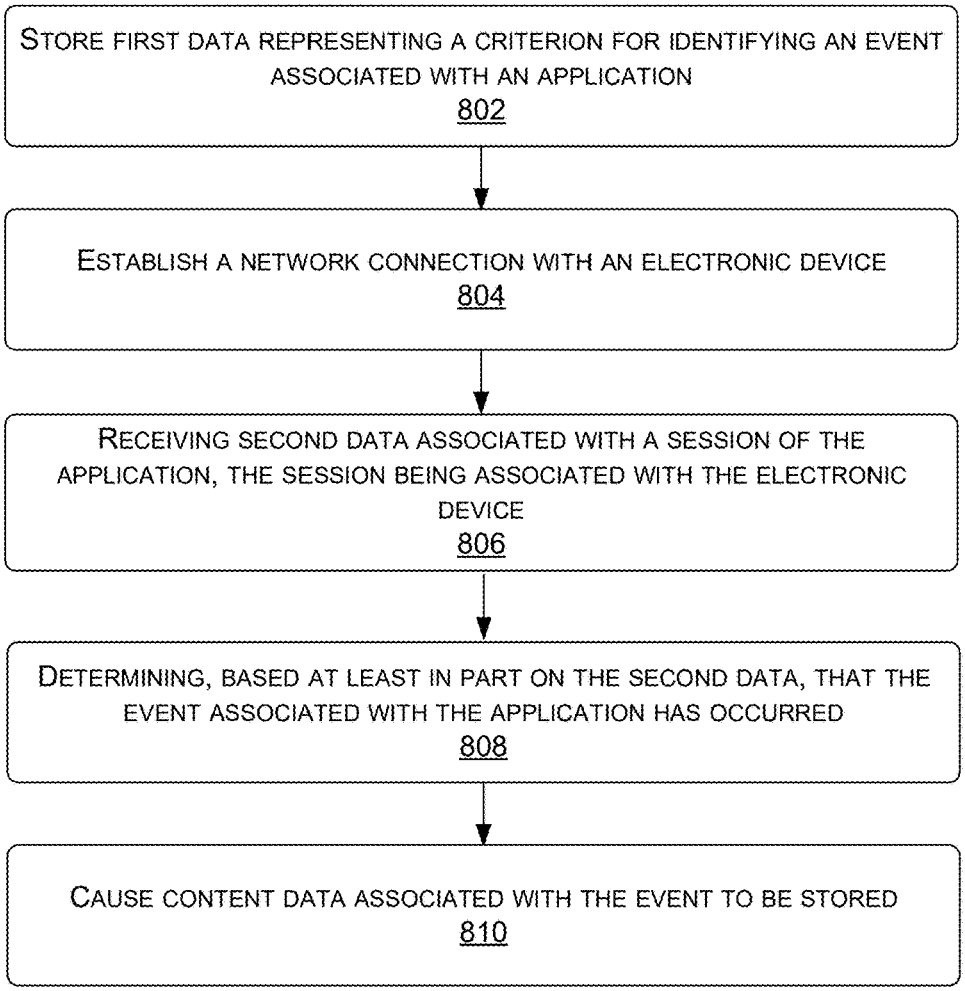
FIG. 8 illustrates a second example process for identifying an event associated with an application and then causing a recording of content based on the event, in accordance with examples of the present disclosure.
Figure 9:
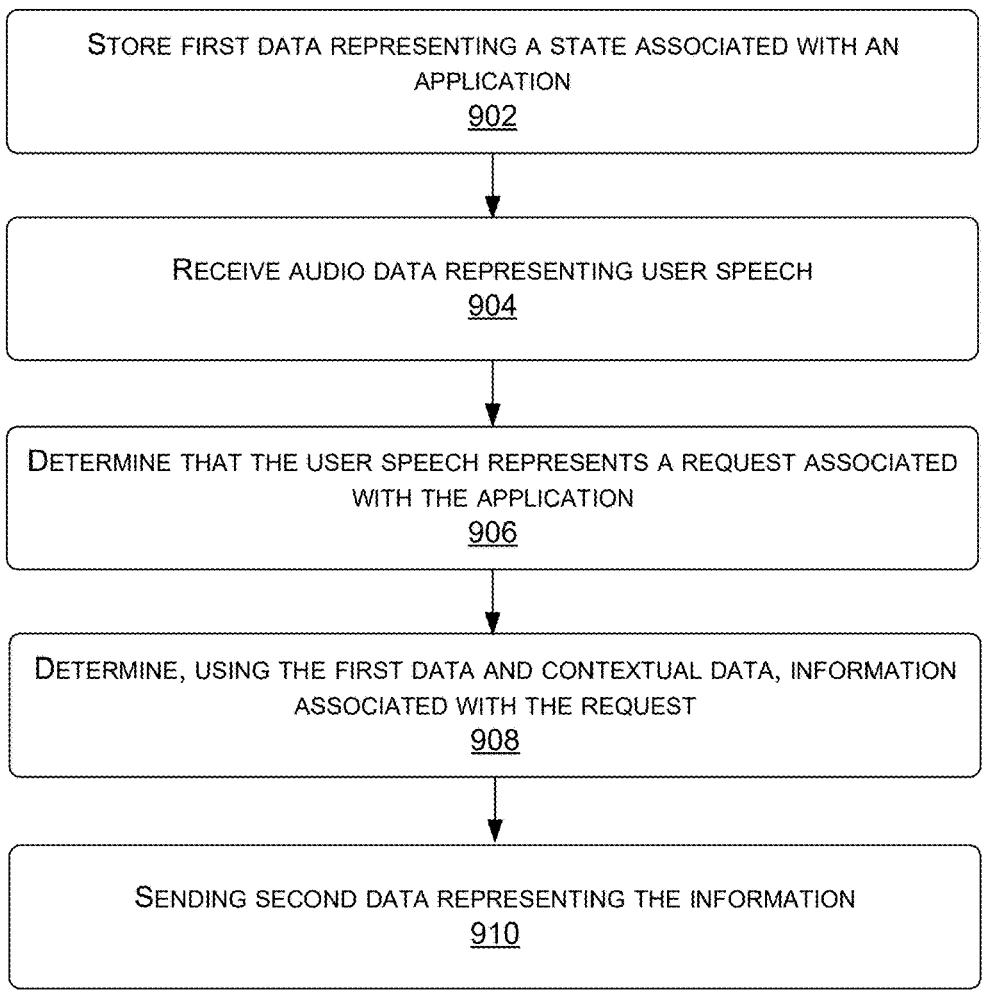
FIG. 9 illustrates an example process for providing contextual help associated with an application, in accordance with examples of the present disclosure.

FIGS. 7-9 illustrate various processes for identifying application events. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 7 illustrates a first example process 700 for identifying an event associated with an application and then causing a recording of content based on the event, in accordance with examples of the present disclosure. At 702, the process 700 may include storing event data representing a criterion for identifying an event associated with an application. For instance, the remote system(s) 104 (e.g., the application system(s) 302 and/or the assistant system(s) 304) may store the event data (e.g., the metrics data 112, the indicator data 114, and/or the conditions data 116). As described herein, the criterion may include at least a threshold amount of motion, a threshold intensity of sound, a threshold rate at which a control device is receiving inputs, a specific object, specific text, a specific sound, one or more words represented by speech, a request represented by speech, and/or any other criterion. In some examples, the event data may represent more than one criterion that the remote system(s) 104 use to identify events within the application.

At 704, the process 700 may include establishing a network connection with an electronic device. For instance, the remote system(s) 104 may establish the network connection with the electronic device (e.g., the user device 106). In some examples, the remote system(s) 104 may also establish a network connection with a separate, control device (e.g., if the control device is separate from the electronic device). The remote system(s) 104 may then receive input data representing a selection of the application. Based on the selection, the remote system(s) 104 may cause a launching of a session for the application. In some examples, the remote system(s) 104 cause the launching using a virtual server. For example, the remote system(s) 104 may install the application on the virtual server and, after the installation, cause the launching on the virtual server.

At 706, the process 700 may include sending, to the electronic device, first content data representing a first state of the application. For instance, the remote system(s) 104 may send the first content data to the electronic device. As described herein, the first content data may include, but is not limited to, first video data representing first images depicting the first state of the application, first audio data representing first sound associated with the first state of the application, and/or first feedback data representing first feedback associated with the first state of the application.

At 708, the process 700 may include receiving input data representing one or more inputs received by a control device and at 710, the process 700 may include updating, using the input data, the first state of the application to a second state of the application. For instance, the remote system(s) 104 may receive the input data from the electronic device and/or the control device. The remote system(s) 104 may then update the first state of the application to the second state of the application using the input data. For example, such as when the application includes a gaming application, the one or more inputs may be associated with moving an object, such as a character, in the gaming environment. As such, the remote system(s) 104 may update the first state of the application to the second state of the application by moving the object within the gaming environment.

At 712, the process 700 may include sending, to the electronic device, second content data representing the second state of the application. For instance, the remote system(s) 104 may send the second content data to the electronic device. As described herein, the second content data may include, but is not limited to, second video data representing second images depicting the second state of the application, second audio data representing second sound associated with the second state of the application, and/or second feedback data representing second feedback associated with the second state of the application.

At 714, the process 700 may include analyzing at least one of the input data or the second content data to determine that the criterion is satisfied. For instance, the remote system(s) 104 may analyze the input data and/or the second content data to determine that the criterion is satisfied. For a first example, such as when the criterion represents a metric, the remote system(s) 104 may determine that the criterion is satisfied based on an amount of motion satisfying the threshold amount of motion, an intensity of sound satisfying the threshold intensity of sound, and/or a rate at which the control device is receiving the one or more inputs satisfying the threshold rate. For a second example, the remote system(s) 104 may determine that the criterion is satisfied based on determining that the content data and/or the input data represents the specific object, the specific text, the specific sound, and/or the one or more words represents by the speech. Based on determining that the criterion is satisfied, the remote system(s) 104 may then determine that the event occurred.

At 716, the process 700 may include causing a storing of at least a portion of the content data that is associated with the event. For instance, the remote system(s) 104 may cause the storing of the at least the portion of the second content data. In some examples, the remote system(s) 104 causes the storing by retrieving and then storing the at least the portion of the second content data in one or more databases. In some examples, the remote system(s) 104 cause the storing by generating and then sending command data representing a command to store the at least the portion of the second content data.

FIG. 8 illustrates a second example process 800 for identifying an event associated with an application and then causing a recording of content based on the event, in accordance with examples of the present disclosure. At 802, the process 800 may include storing first data representing a criterion for identifying an event associated with an application. For instance, the assistant system(s) 304 may store the first data. As described herein, the criterion may include at least a threshold amount of motion, a threshold intensity of sound, a threshold rate at which a control device is receiving inputs, a specific object, specific text, a specific sound, one or more words represented by speech, and/or any other criterion. In some examples, the first data may represent more than one criterion that the assistant system(s) 304 use to identify events within the application.

At 804, the process 800 may include establishing a network connection with an electronic device. For instance, the assistant system(s) 304 may establish the network connection with the electronic device (e.g., the user device 106). In some examples, the assistant system(s) 304 may also establish a network connection with a separate, control device. The assistant system(s) 304 may then receive content data associated with a session of the application. Using the content data, the assistant system(s) 304 may determine a current state of the application and store data representing the current state.

At 806, the process 800 may include receiving second data associated with a session of the application, the session being associated with the electronic device. For instance, the assistant system(s) 304 may receive the second data from the application system(s) 302 and/or the electronic device. In some examples, the second data may include content data representing a state of the application, input data representing one or more inputs received by a control device (e.g., which may be included as part of the electronic device or separate from the electronic device), audio data representing user speech, and/or the like. Additionally, or alternatively, in some examples, the second data may indicate that the event is occurring with respect to the session.

At 808, the process 800 may include determining, based at least in part on the second data, that the event associated with the application has occurred. For instance, the assistant system(s) 304 may determine that the event has occurred using the second data. In some examples, to determine that the event is has occurred, the assistant system(s) 304 may analyze the second data in order to determine that an amount of motion satisfies a threshold amount of motion, an intensity of sound satisfies a threshold intensity of sound, a rate at which the control device is receiving the one or more inputs satisfies a threshold rate, the second data represents a specific object, the second data represents specific text, the second data represents specific sound, and/or the second data represents one or more words associated with the speech. Additionally, or alternatively, in some examples, the assistant system(s) 304 may determine that the event is has occurred based on the second data indicating that the event is occurring.

At 810, the process 800 may include causing content data associated with the event to be stored. For instance, the assistant system(s) 304 may cause the content data associated with the event to be stored. In some examples, the assistant system(s) 304 cause the content data to be stored by sending, to the application system(s) 302 and/or the electronic device, command data representing a command to store the content data.

FIG. 9 illustrates an example process 900 for providing contextual help associated with an application, in accordance with examples of the present disclosure. At 902, the process 900 may include storing first data representing a state associated with an application. For instance, the remote system(s) 104 (e.g., the assistant system(s) 304, the application system(s) 302, etc.) may store the first data representing the current state of the application. In some instances, such as when the process 900 is being performed by the assistant system(s) 304, the assistant system(s) 304 may receive content data from the application system(s) 302 and then use the content data to determine the current state of the application. The assistant system(s) 304 may then generate and store the first data representing the state.

At 904, the process 900 may include receiving audio data representing user speech and at 906, the process 900 may include determining that the user speech represents a request associated with the application. For instance, the remote system(s) 104 may receive the audio data representing the user speech. The remote system(s) 104 may then analyze the audio data using speech recognition in order to identify the one or more words. Next, the remote system(s) 104 may determine that the one or more words represent the request associated with the application. In some examples, the request may be associated with a task of the application, such as to determine the location of an object or determine how to advance through a portion of the application. For example, if the application includes a gaming application, then the request may be for determining the location of a character or determining how to proceed through a level.

At 908, the process 900 may include determining, using the first data and contextual data, information associated with the request. For instance, the remote system(s) 104 may store the contextual data, where the contextual data represents a tutorial, a guide, cheat book, and/or the like associated with the application. The remote system(s) 104 may then use the first data to determine the current state of the user within the application. Using the current state and the contextual data, the remote system(s) 104 may determine the information. For example, and again if the application is the gaming application, the remote system(s) 104 may determine the level that the user is current progressing through and then use the contextual data to determine the location of the object within the level and/or determine how to proceed through the level.

At 910, the process 900 may include sending second data representing the information. For instance, the remote system(s) 104 may generate the second data representing the information. In some examples, the second data includes audio data representing one or more words describing the information. In some examples, the second data includes image data representing text describing the information. Still, in some examples, the second data includes image data representing one or more visual clues associated with the information. In either of the examples, the remote system(s) 104 may then send the second data to the electronic device.

Figure 10:
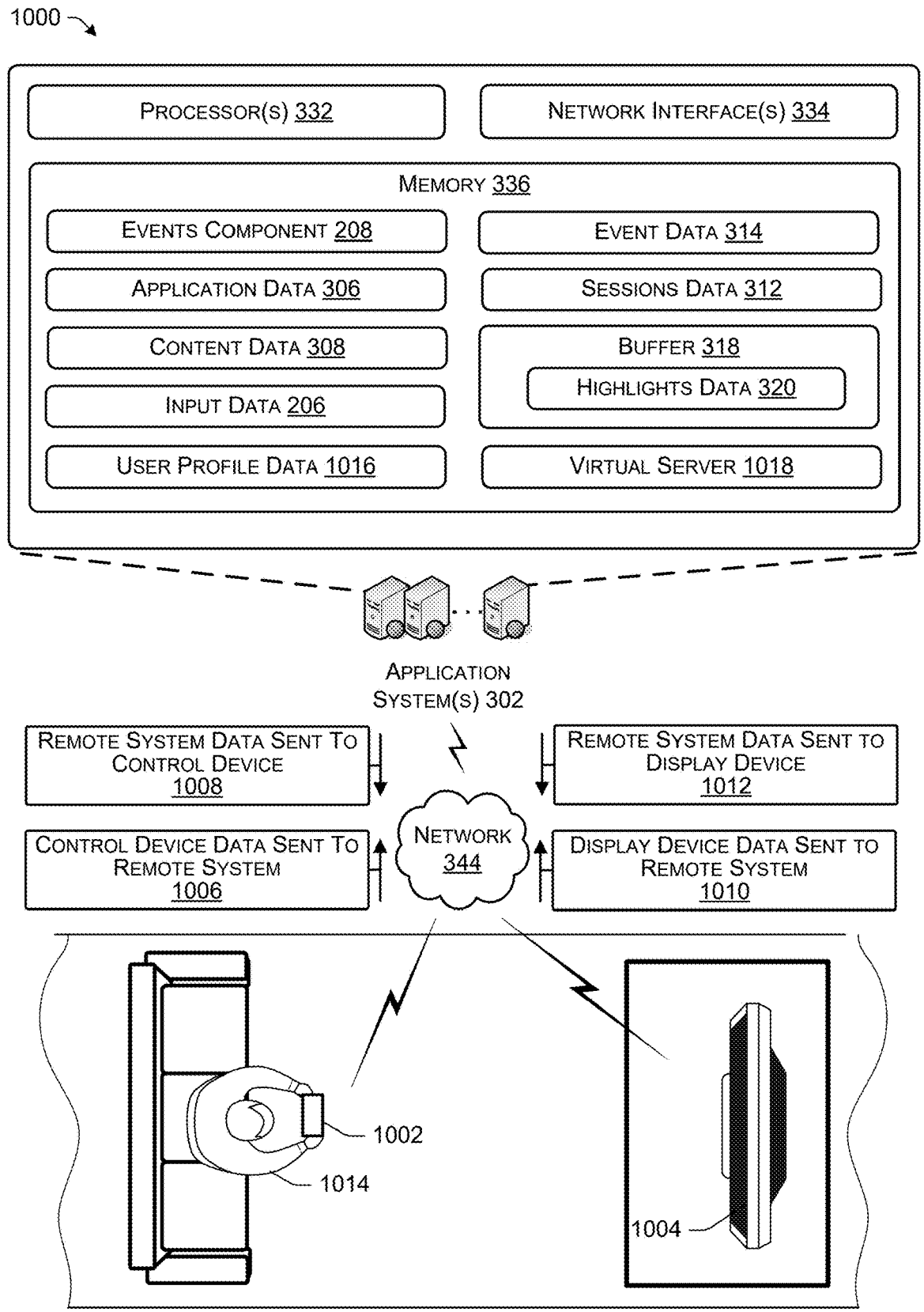
FIG. 10 illustrates a schematic diagram of an example system for controlling applications, in accordance with examples of the present disclosure.

FIG. 10 is a schematic diagram of an example system 1000 for controlling applications, in accordance with examples of the present disclosure. The system 1000 may include, for example, the application system(s) 302, a control device 1002, and a display device 1004. In the example of FIG. 10, the control device 1002 may communicate with the application system(s) 302 over the network(s) 344, such as by using a first communication channel. For instance, the control device 1002 may send data to the application system(s) 302 (which is represented by 1006) and the application system(s) 302 may send data to the control device 1002 (which is represented by 1008). Additionally, the display device 1004 may communicate with the application system(s) 302 over the network(s) 344, such as by using a second communication channel. For instance, the display device 1004 may send data to the application system(s) 302 (which is represented by 1010) and the application system(s) 302 may send data to the display device 1004 (which is represented by 1012).

By sending and receiving data with the control device 1002 and the display device 1004, the application system(s) 302 allow a user 1014 to control, via the application system(s) 302, the application being displayed by the display device 1004 using the control device 1002. For instance, the control device 1002 may connect to the network(s) 344, such as by using configuration settings. The control device 1002 may then send, to the application system(s) 302, identifier data representing at least an identifier associated with the control device 1002. The application system(s) 302 may receive the data and determine, using user profile data 1016, that the identifier data is received from the control device 1002. For example, the application system(s) 302 may match the identifier represented by the identifier data received from the control device 1002 with an identifier associated with the user profile data 1016. Based at least in part on the match, the application system(s) 302 may determine that the identifier data was sent from the control device 1002.

The application system(s) 302 may further determine, using the user profile data 1016, that the control device 1002 is associated with at least the display device 1004. For example, and based at least in part on determining that the identifier data was sent from the control device 1002, the application system(s) 302 may analyze the user profile data 1016 associated with the user 1014. The application system(s) 302 may then determine that the user profile data 1016 includes and/or is associated with data representing an identifier of the display device 1004. Based at least in part on the determination, the application system(s) 302 may determine that the control device 1002 is associated with the display device 1004.

In some instances, the application system(s) 302 may then send, to the display device 1004, content data 308 (e.g., the video data 208, the audio data 210, etc.) representing one or more applications that are available to the user 1014. In some instances, the one or more applications may include one or more applications that have been acquired by the user 1014 (e.g., the one or more applications represented by the application data 306). Additionally, or alternatively, in some instances, the one or more applications may include one or more applications that are free to users. In either example, the display device 1004 may receive the content data 308 from the application system(s) 302. The display device 1004 may then display image(s) that represent the one or more applications that are available to the user 1014. For example, the image(s) may include one or more identifiers (e.g., one or more names) of the one or more applications that are available to the user 1014.

The application system(s) 302 may then receive, from the control device 1002, input data 206 representing input(s) received by the control device 1002. The application system(s) 302 may analyze the input data 206 to identify an application that is selected by the user 1014. For example, the input(s) may correspond to movement(s) of an object, such as a cursor, across the image(s) representing the one or more applications. The input(s) may further correspond to a selection of one of the applications (e.g., a selection of a control on the control device 1002 when the object is located over the selected application). The application system(s) 302 may then determine, based at least in part on the selection, that the user 1014 selected the application.

The application system(s) 302 may then assign the control device 1002 and/or the display device 1004 with a virtual server 1018 associated with the application. In some examples, the application is already preloaded on the virtual server 1018 while in other examples, the application system(s) 302 may start the loading of the application onto the virtual server 1018. Additionally, the application system(s) 302 may cause a launching of the application on the virtual server 1018. In some examples, the launching of the application occurs using a launch file that includes the command(s) associated with launching the application. Once the application is launched, the application system(s) 302 are able to provide content associated with the application.

For example, the application system(s) 302 may send, to the display device 1004, first content data 308 representing a first state of the application. The first content data 308 may include first video data 208 representing image(s) of the first state of the application, first audio data 210 representing sound corresponding to the first state of the application, and/or first timestamp data representing a time for displaying the image(s) and/or a time for outputting the sound. The display device 1004 may receive the first content data 308 from the application system(s) 302. Using the first video data 208, the display device 1004 may display the image(s) representing the first state of the application. For example, if the application includes a gaming application, the display device 1004 may display content representing the first state of the game. In the example of FIG. 10, the first state of the game may include an object (e.g., a character) located at a first position in a gaming environment (e.g., a forest). In some instances, the display device 1004 may further output the sound represented by the first audio data 210.

In some instances, the display device 1004 displays the image(s) and/or outputs the sound according to the time(s) represented by the first timestamp data. For example, the display device 1004 may determine when a current time includes the time represented by the first timestamp data for displaying the first video data 208. Based at least in part on the determination, the display device 1004 may begin displaying the image(s) representing the first state of the application. Additionally, the display device 1004 may determine when a current time includes the time represented by the first timestamp data for outputting the sound. Based at least in part on the determination, the display device 1004 may begin outputting the sound represented by the first audio data 210.

In some instances, the application system(s) 302 may additionally send, to the control device 1002, second content data 308 representing the first state of the application. The second content data 308 may include second audio data 210 representing sound corresponding to the first state of the application and/or second timestamp data representing a time for outputting the sound. The control device 1002 may then output the sound represented by the second audio data 210. In some instances, the control device 1002 may output the sound according to the time represented by the second timestamp data. In some instances, first timestamp data and/or the second timestamp data synchronizes the outputting of the sound by the control device 1002 with the displaying of the image(s) by the display device 1004.

The user 1014 can then use the control device 1002 to provide inputs to the application. For instance, the control device 1002 may receive an input, such as a selection of a button, joystick, key, touch-sensitive pad, sensor, and/or the like associated with the control device 1002. The control device 1002 may then send, to the application system(s) 302, input data 206 representing the input. Using the input data 206, the application system(s) 302 may update the first state of the application to a second state of the application. For example, and using the example above where the application includes the gaming application, the input may be associated with moving the object forward by a given amount within the gaming environment. As such, the application system(s) 302 may analyze the input data 206 to determine that the input includes moving the object forward by the given amount. The application system(s) 302 may then update the first state of the of the application to the second state of the application by moving the object forward in the environment by the given amount.

The application system(s) 302 may then send third content data 308 representing a second state of the application to the display device 1004. The third content data 308 may include third video data 208 representing image(s) of the second state of the application, third audio data 210 representing sound corresponding to the second state of the application, and/or third timestamp data representing a time for displaying the image(s) and/or a time for outputting the sound. The display device 1004 may receive the third content data 308 from the application system(s) 302. Using the third video data 208, the display device 1004 may display image(s) representing the second state of the application. For example, and again using the example where the application includes the gaming application, the display device 1004 may display the object located at the second position within the gaming environment. In some instances, the display device 1004 may further output the sound represented by the third audio data 210. In some instances, the display device 1004 displays the image(s) and/or outputs the sound according to the time(s) represented by the third timestamp data.

In some instances, the application system(s) 302 may additionally send, to the control device 1002, fourth content data 308 representing the second state of the application. The fourth content data 308 may include fourth audio data 210 representing sound corresponding to the second state of the application and/or fourth timestamp data representing a time for outputting the sound. The control device 1002 may then output the sound represented by the fourth audio data 210. In some instances, the control device 1002 may output the sound according to the time represented by the fourth timestamp data. In some instances, third timestamp data and/or the fourth timestamp data synchronizes the outputting of the sound by the control device 1002 with the displaying of the image(s) by the display device 1004.

In some instances, the application system(s) 302 may continue to receive input data 206 from the control device 1002. The application system(s) 302 may then continue to process the input data 206 in order to update the state of the application. Based at least in part on the updating, the application system(s) 302 may continue to send, to the display device 1004, content data 308 (e.g., video data 208, audio data 210, timestamp data, etc.) representing the current state of the application. The application system(s) 302 may further send, to the control device 1002, content data 308 (e.g., audio data 210, timestamp data, etc.) representing the current state of the application. In other words, the application system(s) 302 allow the user 1014 to access the application that is executing on the virtual server 1018.

Figure 11:
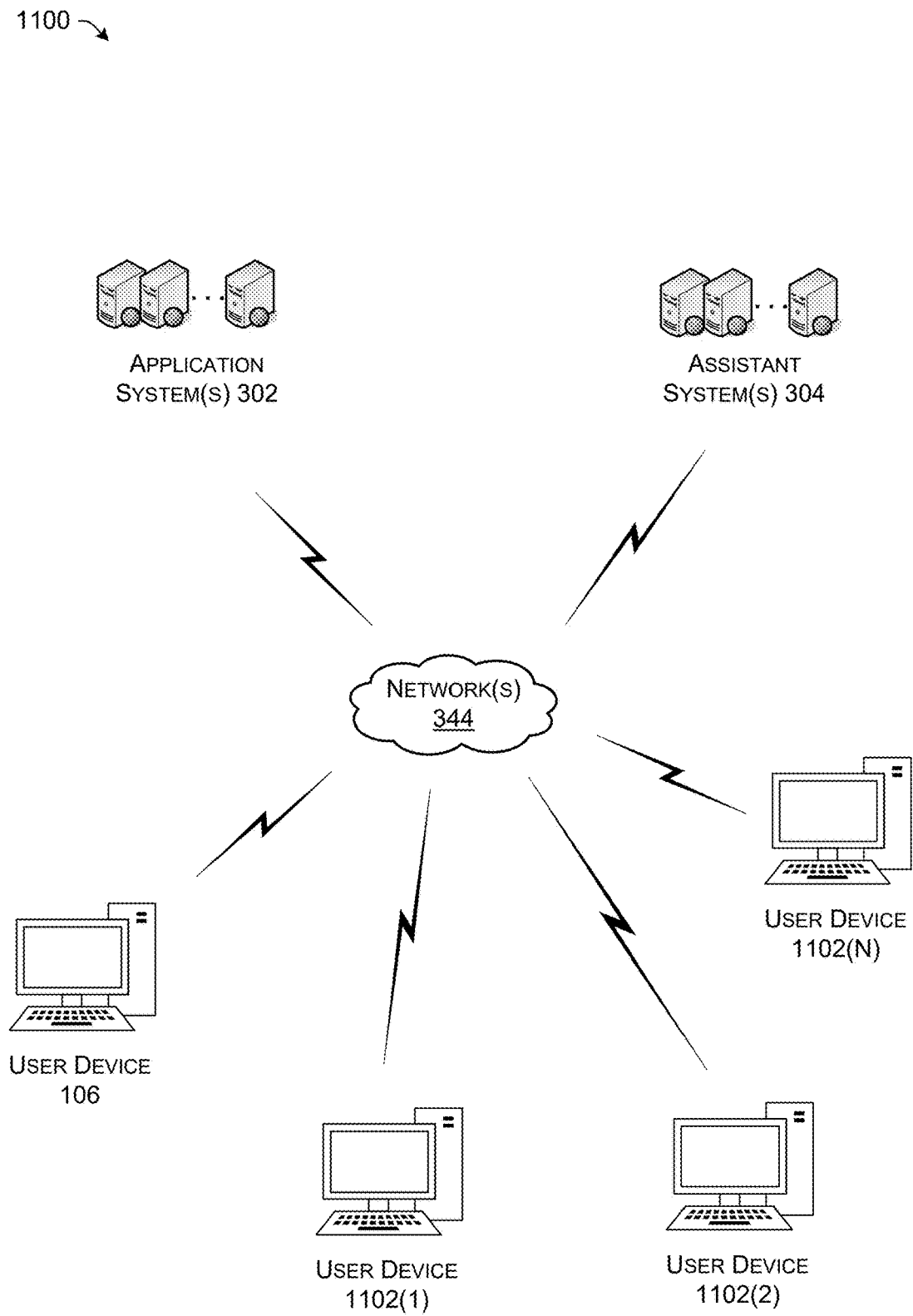
FIG. 11 illustrates a schematic diagram of an example system for communicating for a multiplayer application, in accordance with examples of the present disclosure.

FIG. 11 illustrates a schematic diagram of an example system 1100 for communicating for a multiplayer application, in accordance with examples of the present disclosure. The system 1100 may include, for example, the application system(s) 302, the assistant system(s) 304, the user device 106, and one or more other user devices 1102(1)-(N) (also referred to as "user devices 1102"). In the example of FIG. 11, the application system(s) 302 may receive, over the network 344, input data 206 from the user device 106. The application system(s) 306 may then update, using the input data 206, a local state of an application that is associated with the user device 106. Additionally, the application system(s) 302 may send, to the user device 106 and over the network 344, the content data 308 that represents the local state of the application associated with the user device 106.

The application system(s) 302 may also perform similar processes for each of the other one or more other user devices 1102. For example, the application system(s) 302 may receive, over the network 344, input data from the user device 1102(1). The application system(s) 302 may then update, using the input data, a local state of an application that is associated with the user device 1102(1). Additionally, the application system(s) 302 may send, to the user device 1102(1) and over the network 344, content data that represents the local state of the application associated with the user device 1102(1). The application system(s) 302 may then perform similar processes for each of the other user devices 1102.

In some instances, such as when the application includes a gaming application, the application system(s) 302 may store an authoritative version of the environment of the game. The application system(s) 302 may then use the input data from the user devices to update the positions of objects (e.g., characters, vehicles, buildings, etc.) within the environment. As such, the data representing a local state of the application that is associated with a user device, such as the user device 106, may represent the position(s) of object(s) that are controlled by the user device 106. The application system(s) 302 may then send this data to the user device 106 and/or one or more of the user devices 1102 such that the user device 106 and/or the one or more of the user devices 1102 may update the position(s) of the object(s).

For example, a first local state of the application associated with the user device 106 may be different than a second local state of the application associated with the user device 1102(1). For example, such as during a multiplayer network game, the first local state of the application associated with the user device 106 may represent a first position of a first object within a gaming environment, where the user device 106 is configured to control the first object. As such, the user device 106 may be displaying image(s) that represent the first local state of the application. Additionally, the second local state of the application associated with the user device 1102(1) may represent a second position of a second object within the gaming environment, where the user device 1102(1) is configured to control the second object. As such, the user device 1102(1) may be displaying image(s) that represent the second local state of the application.

In such instances, when the application system(s) 302 update the second local state of the application associated with the user device 1102(1), such as by changing the position of the second object within the gaming environment, the application system(s) 302 may further update the first local state of the application to include the updated position of the second object. As such, the first local state of the application may represent both the first position of the first object and the updated position of the second object.

In some instances, multiple control devices may be associated with a single user device 106 (e.g., multiple control devices 1102 may be associated with a single display device 1004). For example, a first user may be using a control device to control the application that is being displayed by the user device 106 while a second user is using a second control device to control the application that is being displayed by the user device 106. For instance, the application system(s) 302 may be receiving, over the network 344, data (e.g., input data) from each of the first control device and the second control device. The application system(s) 302 may then update the state of the application using the data that is received from each of the first control device and the second control device. Additionally, the application system(S) 302 may be sending, over the network 344, content data (e.g., video data, audio data, feedback data, etc.) to the user device 106 that represents the current state of the application.

In these multiplayer examples, the device(s) (e.g., the application system(s) 302, the assistant system(s) 304, the user device 106, etc.) may then analyze the data (e.g., the input data and the content data for each user) associated with the multiplayer application in order to detect events, using similar processes as those described above. Additionally, when detecting an event, the device(s) may cause one or more actions to occur. In some examples, the device(s) may cause actions to occur for more than one user when an event is detected. For example, if the device(s) analyze the content data that is being sent to the user device 106 and, based on the analysis, detect an event, then the device(s) may cause the same action to occur for the user device 106 and one or more of the user devices 1102. For instance, the device(s) may cause a storing of content data that is being sent to each of the user devices 106 and 1102 based on detecting the event. This may be because the content data being sent to each of the user devices 106 and 1102 may all represent the event, such as from different angles or different points of view. When performing such processes, the device(s) may also retrieve all of the content data associated with the event and provide the content data to all of the users (e.g., send the highlights associated with the content data to all of the user devices 106 and 1102).

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:
1. A system comprising:
  one or more processors; and one or more computer-readable media storing instructions
that, when executed by the one or more processors,
cause the system to perform operations comprising:
receiving criteria data generated by at least one of an
electronic device associated with user profile data or
a gaming controller associated with the user profile
data;
storing the criteria data in association with the user
profile data, the criteria data representing a metric for
identifying an event associated with one or more
highlights associated with a game;
establishing, over a network, a network connection
with the electronic device;
receiving identifier data associated with the gaming
controller;
determining the identifier data matches an identifier
associated with the user profile data;
sending, over the network and to the electronic device,
first content data representing a first state of the
game;
receiving, over the network, input data representing one
or more inputs received from the gaming controller;
based at least in part on the input data, updating the first
state of the game to a second state of the game;
sending, over the network and to the electronic device,
second content data representing the second state of
the game;
storing the second content data in a rolling buffer of the
electronic device or the gaming controller;
analyzing the second content data to determine at least
a characteristic associated with the second content
data;
determining, based at least in part on the characteristic
and the criteria data, that the metric is satisfied;
determining that the event has occurred based at least
in part on the metric being satisfied;
identifying, based at least in part on the criteria data,
that at least a portion of the second content data
stored in the rolling buffer represents a highlight of
the one or more highlights;
generating, based at least in part on identifying that at
least the portion of the second content data stored in
the rolling buffer represents the highlight, command
data including an indicator that points to at least the
portion of the second content data stored in the
rolling buffer that represents the highlight, the com-
mand data representing a command to retrieve at
least the portion of the second content data stored in
the rolling buffer that represents the highlight, from
the rolling buffer and store at least the portion of the
second content data in one or more databases for
sharing the highlight; and
sending, over the network and to the electronic device,
the command data.

2. The system as recited in claim 1, wherein:
the second content data includes video data representing
the second state of the game; and
analyzing the video data in order to determine the char-
acteristic associated with the video data comprises
analyzing the video data to determine an amount of
motion represented by the video data; and
determining that the metric is satisfied comprises deter-
mining, based at least in part on the criteria data, that
the amount of motion is equal to or greater than a
threshold amount of motion.

3. The system as recited in claim 1, wherein:
the second content data includes audio data representing
the second state of the game; and
analyzing the audio data in order to determine the char-
acteristic associated with the audio data comprises
analyzing the audio data to determine an intensity of
sound represented by the audio data; and
determining that the metric is satisfied comprises deter-
mining, based at least in part on the criteria data, that
the intensity of sound is equal to or greater than a
threshold intensity of sound.

4. A method comprising:
receiving criteria data generated by at least one of an
electronic device associated with user profile data or a
gaming controller associated with the user profile data;
storing the criteria data in association with the user profile
data for identifying an event associated with one or
more highlights associated with a game;
receiving identifier data associated with the gaming con-
troller;
determining the identifier data matches an identifier asso-
ciated with the user profile data;
sending, to the electronic device, first content data asso-
ciated with a first state of the game;
receiving input data generated by at least one of the
electronic device or the gaming controller;
sending, to the electronic device, second content data
associated with a second state of the game, the second
state of the game being based at least in part on the first
state of the game and the input data;
storing the second content data in a rolling buffer of the
electronic device or the gaming controller;
determining, based at least in part on the identifier data
matching the identifier and using the criteria data, that
the second content data stored in the rolling buffer
represents the event, wherein:
the criteria data represents an object associated with the
game; and
determining that the second content data stored in the
rolling buffer represents the event comprises deter-
mining, using the criteria data, that the second con-
tent data stored in the rolling buffer represents the
object;
identifying, based at least in part on the criteria data, that
at least a portion of the second content data stored in the
rolling buffer represents a highlight of the one or more
highlights; and
based at least in part on determining that the second
content data stored in the rolling buffer represents the
event, generating command data, including an indicator
that points to at least the portion of the second content
data stored in the rolling buffer that represents the
highlight, causing the second content data stored in the
rolling buffer to be retrieved from the rolling buffer and
stored in one or more databases.

5. The method as recited in claim 4, wherein causing the
second content data stored in the rolling buffer to be stored
in one or more databases comprises at least one of:
sending, to the electronic device, a first command to store
the second content data; or
sending, to one or more computing devices executing the
game, a second command to store the second content
data.

6. The method as recited in claim 4, wherein:
the criteria data represents a threshold amount of motion;
and determining that the second content data represents the
event comprises:
determining an amount of motion associated with the
second content data; and
determining, using the criteria data, that the amount of
motion satisfies the threshold amount of motion.
7. The method as recited in claim 4, wherein:
the criteria data represents a threshold intensity of sound;
and
determining that the second content data represents the
event comprises:
determining an intensity of sound associated with the
second content data; and
determining, using the criteria data, that the intensity of
sound satisfies the threshold intensity of sound.
8. The method as recited in claim 4, further comprising:
storing additional criteria data representing a threshold
rate;
receiving additional input data generated by at least one of
the electronic device or the gaming controller;
sending, to the electronic device, third content data associated with a third state of the game, the third state of the game being based at least in part on the second state of the game and the additional input data;
determining an input rate associated with the additional input data;
determining, using the criteria data, that the input rate satisfies the threshold rate; and
based at least in part on determining that the input rate satisfies the threshold rate, causing the third content data to be stored.
9. The method as recited in claim 4, wherein:
the criteria data represents text associated with the game; and
determining that the second content data represents the event comprises determining, using the criteria data, that the content data represents the text.
10. The method as recited in claim 4, wherein:
the criteria data represents one or more first words; and
determining that the second content data represents the event comprises:
analyzing the second content data to determine one or more second words represented by speech; and
determining, using the criteria data, that the one or more second words are similar to the one or more first words.
11. The method as recited in claim 4, wherein:
the criteria data represents a specific sound; and
determining that the second content data represents the event comprises determining, using the criteria data, that the second content data represents the specific sound.
12. The method as recited in claim 4, further comprising:
receiving audio data generated by at least one of the electronic device or the gaming controller;
determining one or more words represented by the audio data;
determining that the one or more words represent a request that is associated with a task of the game;
determining that a current state of the game includes the second state of the game;
determining, based at least in part on contextual data, a response to the task;
generating output data representing the response; and
sending the output data to the electronic device.

13. The method as recited in claim 4, further comprising:
receiving condition data representing a condition associated with a session of the game, the condition including at least one of:
a contact connecting to the session;
the contact disconnecting from the session;
a network connectivity associated with the electronic device;
a problem with the electronic device; or
an entitlement acquired for the game;
generating audio data representing one or more words that identify the condition; and
sending the audio data to the electronic device.
14. The method as recited in claim 4, wherein the game includes a multiplayer game, and wherein the method further comprises:
sending, to an additional electronic device, third content data representing a third state of the game; and
based at least in part on determining that the second content data represents the event, causing the third content data to also be stored.
15. A system comprising:
one or more processors; and
one or more computer-readable media storing instructions that, when executed by the one or more processors, cause the system to perform operations comprising:
receiving criteria data generated by at least one of an electronic device associated with user profile data or a gaming controller associated with the user profile data;
storing the criteria data in association with the user profile data for identifying an event associated with one or more highlights associated with a game;
receiving identifier data associated with the gaming controller;
determining the identifier data matches an identifier associated with the user profile data;
sending, to the electronic device, first content data associated with a first state of the game;
receiving input data generated by at least one of the electronic device or the gaming controller;
sending, to the electronic device, second content data associated with a second state of the game, the second state of the game being based at least in part on the first state of the game and the input data;
storing the second content data in a rolling buffer of the electronic device or the gaming controller;
determining, based at least in part on the identifier data matching the identifier and using the criteria data, that the second content data represents the event;
identifying, based at least in part on the criteria data, that at least a portion of the second content data represents a highlight of the one or more highlights;
based at least in part on determining that the second content data stored in the rolling buffer represents the event, generating command data, including an indicator that points to at least the portion of the second content data stored in the rolling buffer that represents the highlight, causing the second content data stored in the rolling buffer to be retrieved from the rolling buffer and stored in one or more databases;
receiving, from at least one of the electronic device or the gaming controller, a request for the highlight; and
sending the second content data stored in the in one or more databases to the electronic device.

16. The system as recited in claim 15, wherein:
the criteria data represents a threshold amount of motion; and
determining that the second content data represents the event comprises:
- determining an amount of motion associated with the second content data; and
- determining, using the criteria data, that the amount of motion satisfies the threshold amount of motion.

17. The system as recited in claim 15, wherein:
the criteria data represents a threshold intensity of sound; and
determining that the second content data represents the event comprises:
- determining an intensity of sound associated with the second content data; and
- determining, using the criteria data, that the intensity of sound satisfies the threshold intensity of sound.

18. The system as recited in claim 15, wherein:
the criteria data represents an object associated with the game; and
determining that the second content data represents the event comprises determining, using the criteria data, that the second content data represents the object.

19. The system as recited in claim 15, wherein:
the criteria data represents text associated with the game; and
determining that the second content data represents the event comprises determining, using the criteria data, that the content data represents the text.

20. The system as recited in claim 15, wherein:
the criteria data represents one or more first words; and
determining that the second content data represents the event comprises:
- analyzing the second content data to determine one or more second words represented by speech; and
- determining, using the criteria data, that the one or more second words are similar to the one or more first words.

* * * * *